US007315791B2

(12) United States Patent
Ilic et al.

(10) Patent No.: US 7,315,791 B2
(45) Date of Patent: Jan. 1, 2008

(54) APPLICATION PROGRAMMING INTERFACE FOR SYNCHRONIZING MULTIPLE INSTRUMENTATION DEVICES

(75) Inventors: Kosta Ilic, Austin, TX (US); Christopher T. Bartz, Austin, TX (US)

(73) Assignee: National Instruments Corporation, Austin, TX (US)

(*) Notice: Subject to any disclaimer, the term of this patent is extended or adjusted under 35 U.S.C. 154(b) by 376 days.

(21) Appl. No.: 10/781,447

(22) Filed: Feb. 18, 2004

(65) Prior Publication Data

US 2005/0183098 A1 Aug. 18, 2005

(51) Int. Cl.
*G01M 19/00* (2006.01)
(52) U.S. Cl. .................................... 702/125
(58) Field of Classification Search ............... 702/125
See application file for complete search history.

(56) References Cited

U.S. PATENT DOCUMENTS

| | | | |
|---|---|---|---|
| 5,566,180 A | 10/1996 | Eidson et al. | |
| 5,586,305 A | 12/1996 | Eidson et al. | |
| 6,278,710 B1 | 8/2001 | Eidson | |
| 6,279,124 B1* | 8/2001 | Brouwer et al. | 714/38 |
| 6,370,159 B1 | 4/2002 | Eidson | |
| 6,663,924 B1* | 12/2003 | Higashino et al. | 428/34.1 |
| 2003/0037254 A1 | 2/2003 | Fischer et al. | |
| 2003/0046448 A1* | 3/2003 | Fischer et al. | 709/328 |
| 2003/0137528 A1* | 7/2003 | Wasserman et al. | 345/700 |
| 2004/0034491 A1* | 2/2004 | Kim | 702/79 |
| 2004/0064750 A1* | 4/2004 | Conway | 713/401 |

OTHER PUBLICATIONS

U.S. Appl. No. 10/854,910, filed May 27, 2004, Nattinger.
Brandon, "Synchronizing Multiple AD9850/AD9851 DDS-Based Synthesizer", AN-587 Application Note, Analog Devices, 2002, (8 pages).

* cited by examiner

*Primary Examiner*—John Barlow
*Assistant Examiner*—Aditya S. Bhat
(74) *Attorney, Agent, or Firm*—Meyertons Hood Kivlin Kowert & Goetzel, P.C.; Jeffrey C. Hood; Mark S. Williams

(57) ABSTRACT

An application programming interface (API) for synchronizing multiple devices in a system. The API includes a plurality of functions invocable in a program to synchronize multiple devices, where each function is executable to perform a respective functionality related to synchronizing the devices, and at least one of the functions is executable to access a plurality of instrument drivers corresponding respectively to the plurality of devices to synchronize the plurality of devices. In synchronizing the plurality of devices, the functions determine a trigger clock signal for each of the plurality of devices, and synchronize the plurality of devices based on the determined trigger clock signals. The API also includes a plurality of attributes corresponding to respective properties of the system related to synchronization of the devices, including one or more trigger attributes and/or one or more trigger clock attributes for each of the devices. The API representations may be text-based and/or graphical.

20 Claims, 19 Drawing Sheets

Computer System
82

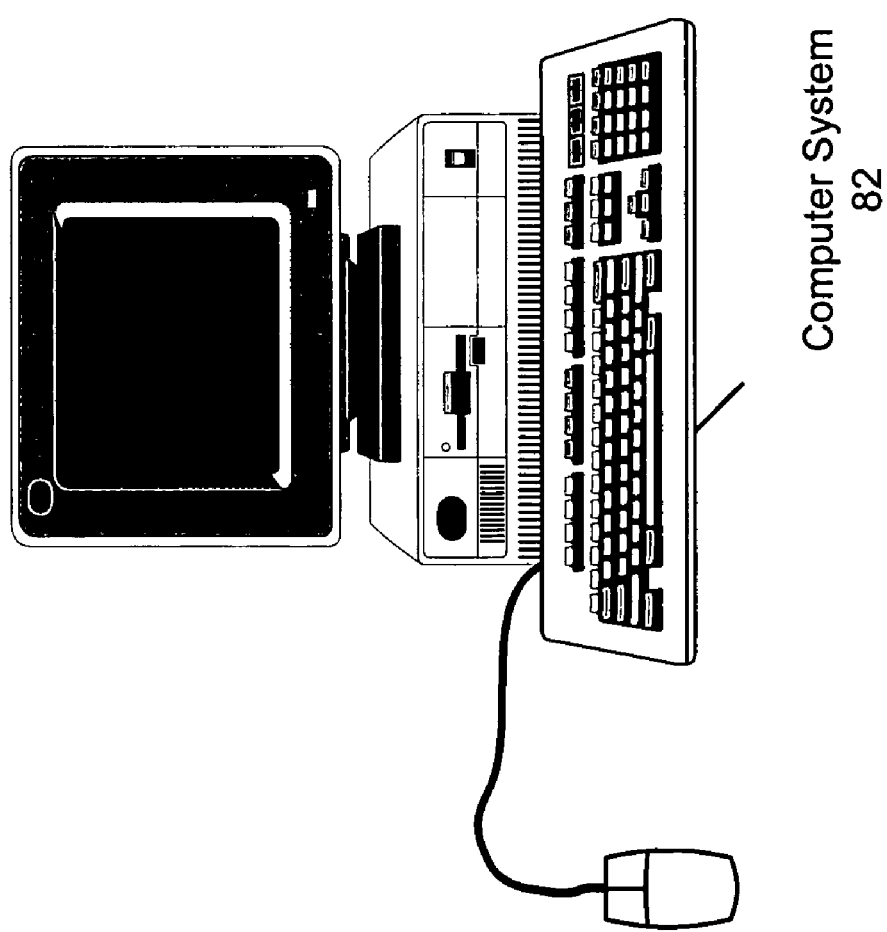

| Scenarios | Functions | | | | | | | Attributes | | | | | | | | |
|---|---|---|---|---|---|---|---|---|---|---|---|---|---|---|---|---|
| | ConfigureForHomogeneousTrigge | Synchronize | Initiate | IsDone | WaitUntilDone | GetErrorString | GetExtendedErrorInfo | START_TRIG_MASTER_SESSION | REF_TRIG_ORIGINAL_SESSION | SCRIPT_TRIG_MASTER_SESSION | PAUSE_TRIG_MASTER_SESSION | REF_TRIG_IS_FROM_NON_REF_TRIG | TCLK_SYNC_PULSE_SRC | TCLK_SYNC_PULSE_OUTPUT_TERM | TCLK_MIN_PERIOD | SAMP_CLK_DELAY |
| Single Chassis, Homogeneous Triggers | ✓ | | | | | | | | | | | | | | | |
| Single Chassis, Heterogeneous Triggers | | ✓ | ✓ | ✓ | ✓ | ✓ | ✓ | t | t | t | t | t | | | | s |
| Multiple Chassis | | ✓ | ✓ | ✓ | ✓ | ✓ | ✓ | t | t | t | t | t | ✓ | ✓ | ✓ | s |

✓: all cases
s: sample clock delay is optional in all cases
t: use attributes that pertain to triggers being synchronized

Figure 7

APPLICATION PROGRAMMING INTERFACE FOR SYNCHRONIZING MULTIPLE INSTRUMENTATION DEVICES

FIELD OF THE INVENTION

This invention relates to instrumentation systems and, more particularly, to an application programming interface (API) for synchronizing instrumentation devices, where the API may be text-based and/or graphical.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer. A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Some instruments are devices that collect data or information from an environment or unit under test (UUT) and display this information to a user. An instrument may also analyze and process acquired data prior to displaying the data to the user. Some instruments provide test stimuli to a UUT. Examples of instruments include oscilloscopes, digitizers, digital multimeters, pressure sensors, arbitrary waveform generators, digital waveform generators, etc. The information that may be collected by respective instruments includes information describing voltage, resistance, distance, velocity, pressure, frequency of oscillation, humidity, or temperature, among others.

Computer-based instrumentation systems typically include transducers for transducing a physical phenomenon into an electrical signal, signal conditioning logic to perform amplification, isolation, and/or filtering, and analog-to-digital (A/D) conversion logic for receiving analog signals and providing corresponding digital signals to the host computer system.

In a computer-based system, the instrumentation hardware or device is typically an expansion board plugged into one of the I/O slots of the computer system. In another common instrumentation system configuration, the instrumentation hardware is coupled to the computer system via other means such as through a VXI (VME eXtensions for Instrumentation) bus, a GPIB (General Purpose Interface Bus), a PXI (PCI eXtensions for Instrumentation) bus, a computer peripheral bus (e.g., PCI bus), a serial port or bus, or parallel port of the computer system. The instrumentation hardware may include a DAQ board, a computer-based instrument such as a multimeter, or another type of instrumentation device.

The instrumentation hardware may be configured and controlled by software executing on the computer system, where the combination of instrumentation hardware and software may be referred to as a Virtual Instrument. The software for configuring and controlling the instrumentation system typically includes driver software and the instrumentation application software, or the application. The driver software serves to interface the instrumentation hardware to the application and is typically supplied by the manufacturer of the instrumentation hardware or by a third party software vendor. The application is typically developed by the user of the instrumentation system and is tailored to the particular function that the user intends the instrumentation system to perform. The instrumentation hardware manufacturer or third party software vendor sometimes supplies application software for applications that are common, generic, or straightforward.

Instrumentation driver software provides a high-level interface to the operations of the instrumentation device. The instrumentation driver software may operate to configure the instrumentation device for communication with the host system and to initialize hardware and software to a known state. The instrumentation driver software may also maintain a soft copy of the state of the instrument and initiated operations. Further, the instrumentation driver software communicates over the bus to move the device from state to state and to respond to device requests.

Some computerized instrumentation systems include several instrumentation and/or DAQ devices. Each device may generate and/or capture data based on a sample clock. For example, the sample clock on an arbitrary waveform generator may drive a digital to analog converter (DAC). Two or more devices may be considered to be digitally synchronized when their data capture and/or data generation circuits line up within a sample clock cycle. Digital synchronization may occur when the sample clocks of each device to be synchronized have substantially the same frequency (e.g., the devices' sample clocks may experience instantaneous frequency differences but, on average, the devices' sample clocks may not drift relative to each other). In addition, for digital synchronization, the devices to be synchronized are able to respond to a trigger within the same sample clock period, and in the case of output devices, to output their data to a connector at substantially the same time. As described herein, two clocks are in phase when they are measured as having substantially the same frequency and substantially zero degrees of phase difference.

If the sample clock frequency for a set of devices is chosen to be an integer multiple of a reference clock signal received by all of the devices in that set, and if the frequency multiplier used within each device has substantially zero degrees of phase delay, then the devices in that set will have sample clocks that are synchronous to each other, subject to the tolerance of the reference signal, their layout, and the sample clock generation circuits used by each device. As such, a rising edge on the reference signal will correspond to a rising edge on each device's sample clock.

Even though choosing the sample clock frequency to be an integer multiple of a common reference signal may result in sample clocks that are in phase from device to device (subject to various component and routing tolerances), it may not necessarily achieve a desired type of synchronization (e.g., digital synchronization). For example, in order to achieve digital synchronization between a set of instrumentation devices, trigger conditions should affect every device in the set on the same sample clock edge. If the frequency of the sample clock is too high to reliably pass a bused signal from one device to another within one sample period, the trigger signals may either be sent in a slower clock domain than that of the sample clock, such as the reference clock domain, or a non-bused means of sending the trigger signal (such as a point-to-point connection) may be used to send trigger signals.

In systems where the set of devices have sample clock frequencies that are not integer multiples of the sample clock frequency, achieving digital synchronization may be even more difficult. The reference clock signal seen by the devices in the set may have a low enough frequency that trigger signals clocked by the reference clock signal can be reliably passed from device to device. However, rising edges on the reference clock may not correspond to rising edges on the sample clock since the frequency of the sample clock is not an integer multiple of the reference clock. If the rising edges of the two clocks do not correspond (or if the phase relationship of sample clocks to the reference clock cannot be guaranteed), clocking trigger signals with the reference clock signal may ensure that devices of the same sample clock frequency will see a trigger at roughly the same time. However, clocking trigger signals with the reference clock signal may not ensure that two devices will see the trigger assertion in the same sample clock cycle.

To illustrate this point, assume two devices each include the simple circuit shown in FIG. 1 for trigger transfer from the reference clock domain to the sample clock domain. In FIG. 1, a first D flip-flop 10 receives a trigger input (e.g., from a bus connecting several instrumentation devices). D flip-flop 10 is clocked by the common reference signal (e.g., a 10 MHz signal). The output of D flip-flop 10, cTrig, is input to a second D flip-flop 12, which is clocked by each device's sample clock. The output of D flip-flop 12 is signal mTrig.

Even if the sample clocks of the two devices are in phase, the trigger may not be seen in the same sample clock cycle on both devices, as illustrated in the timing diagram of FIG. 2. As FIG. 2 shows, output cTrig of the first flip-flop 10 may change too close to the rising edge of the sample clock, causing a setup violation because the input to the second flip-flop has not been stable for the necessary setup time. This setup violation causes output mTrig of the second flip-flop 12 to be metastable. When the metastability finally settles, it may do so differently on each device, causing them to see the same transition in the trigger signal in different sample clock cycles. Thus, synchronization may be difficult when the sample clock frequency is not an integer multiple of the reference clock frequency.

As these examples show, it is desirable to be able to synchronize multiple devices in an instrumentation system, even if the devices use sample clocks whose frequencies are not integer multiples of a common reference frequency. For example, it is desirable to be able to have digitally synchronized instrumentation devices.

However, depending upon the complexity of the instrumentation system, the number of function calls required to synchronize multiple instruments may be quite large, and the calling order of the function calls may be quite complex. Additionally, function calls must generally be made manually to device drivers for each of the instruments, and thus the synchronization process may be tedious and error prone.

SUMMARY OF THE INVENTION

One embodiment of the present invention comprises an application programming interface (API) for synchronizing multiple instruments, e.g., in a measurement system. More specifically, a plurality of functions may be provided which are invocable to allow instruments, e.g., high-speed modular instruments, to respond substantially simultaneously to external triggers. For example, in various embodiments, the API may facilitate synchronization of modular instruments (boards) in single or multiple chassis, e.g., PXI chassis; when same or different triggers are shared, e.g., a start trigger from one device used as a start trigger on another device, or a start trigger from one device used as a reference trigger by another device; and/or when sample clock rates for the devices are equal or different. The term "session" refers to a run-time instance of a data structure that provides context for communicating and interacting with a particular physical device or instrument, a portion or subset of a physical device or instrument, or a collection of physical devices or instruments.

In one embodiment, one or more of the functions may be different from typical instrument driver functions in that they may access or interact with multiple device drivers rather than one at a time. For example, one or more of the functions may take an array of device (also referred to as session) references (as opposed to individual devices or sessions) as an argument. In a preferred embodiment, the plurality of functions may be invocable from a program to implement a multi-device synchronization scheme based on a trigger clock signal, referred to as a T Clock, a periodic signal used for trigger transmission. Note that in a preferred embodiment, T Clock is not shared by the devices, but instead is generated by each instrument from its reference or sample clock. In order for T Clocks to be generated in this manner, synchronized instruments preferably have a common reference clock (in case of internal sample clocks) or a common sample clock (in case of external sample clocks).

Various portions of the API may be used to synchronize devices with homogeneous triggers and devices with heterogeneous triggers. Devices are considered to have homogeneous triggers when all triggers supported by those devices that can be T Clock synchronized are shared. For example, in one embodiment, the following triggers may be T Clock synchronized: Start trigger for acquisitions and generations, where generations refers to signal generation; Reference trigger (applies to acquisitions only); Script trigger (applies to generations only); and Pause trigger for generations.

Note that in one embodiment, other triggers that may be available on modular instruments, including pause triggers for acquisitions, may not be T Clock synchronized. For example, if sessions A and B support only start triggers, and the start trigger from A is used as a start trigger by B, then A and B have homogeneous triggers. As another example, if session A supports only start triggers, and session B supports both start and reference triggers, then if the start trigger from A is used as a start trigger by B, then A and B have homogeneous triggers because all triggers supported by A and B that can be T Clock synchronized (in this case, only the start trigger) are shared.

Modular instrument sessions are considered to have heterogeneous triggers when they do not have homogeneous triggers. For example, if session A supports only start trigger, and session B supports start and reference triggers, and if the start trigger from A is used as a reference trigger by B, and the start trigger for B is not related to A, then A and B are considered to have heterogeneous triggers because their start triggers are not shared.

In one embodiment, a sync pulse may be used to synchronize T Clocks on different instruments, where the sync pulse is preferably produced by one of the synchronized instruments and sent to other instruments in the system. If all of the instruments are in one chassis, a function, e.g., a synchronize function, described below, may route this signal automatically, assuming that a trigger line (e.g., a PXI trigger line) is available for this routing. If the plurality of instruments are in different chassis, the user may need to route this signal.

In one embodiment, a sync pulse clock signal may also be used for synchronization of T Clocks on different instruments. For example, in a PXI system, the sync pulse clock signal is preferably provided on a PXI_Clk10 line and is preferably a 10 MHz signal. In one embodiment, a function, e.g., the synchronize function, may route this signal automatically. If the instruments are in different chassis, all PXI_Clk10 signals in the chassis are preferably driven from the same clock source. Matched-length cables may be used to drive PXI_Clk10 on different chassis to minimize phase differences between the chassis, as is well known in the art.

Thus, in one embodiment, the API may include a plurality of functions for specifying and performing synchronization among a plurality of devices or instruments in a system, where the functions are executable to create and/or manage various clock and trigger signals in synchronizing the devices. In a preferred embodiment, at least one of the functions is executable to access a plurality of instrument drivers corresponding respectively to the plurality of devices to synchronize the devices. In one embodiment, the plurality of functions may be executable to determine a trigger clock signal (T Clock) for each of the plurality of devices, and synchronize the plurality of devices based on the determined trigger clock signals. Additionally, in one embodiment, in addition to the plurality of functions, the API may also include a plurality of attributes, each attribute corresponding to a respective property of the system related to synchronization of the plurality of devices, where each attribute is configurable to specify the respective property.

In one embodiment, the plurality of functions may include the plurality of functions may include a synchronize function, executable to synchronize the trigger clock signals for the plurality of devices, and zero or more of: a configuration function, executable to configure at least a subset of the plurality of attributes for synchronization of the plurality of devices; an initiate function, executable to initiate synchronous operation of the plurality of devices; a done function, executable to monitor the operation of the plurality of devices; and a wait until done function, executable to indicate when operation of the plurality of devices is done. In one embodiment, the plurality of functions may further include one or more of: a get error description function, executable to provide an error description, e.g., based on an error code; and a get extended error information function, executable to provide extended error information for an error, e.g., the most recent error detected. Other functions may also be included in the API as desired to facilitate the synchronization process, such as, for example, set/get functions for synchronization attributes, described below, and so forth.

As mentioned above, in one embodiment, the API may also include a plurality of attributes, where each attribute corresponds to a respective property of the system related to synchronization of the plurality of devices, and where each attribute is configurable to specify the respective property. In a preferred embodiment, the plurality of attributes includes a set of attributes for each respective device of the plurality of devices. In other words, each of the plurality of devices may have a respective set of attributes specifying synchronization for the device and/or the system. For example, in one embodiment, the set of attributes for each respective device of the plurality of devices may include one or more trigger attributes and/or one or more trigger clock attributes, among others. Examples of trigger attributes include a start trigger master session attribute, specifying which of the plurality of devices provides a start trigger; a reference trigger master session attribute, specifying which of the plurality of devices provides a reference trigger; a script trigger master session attribute, specifying which of the plurality of devices provides a script trigger; a pause trigger master session attribute, specifying which of the plurality of devices provides a pause trigger; and a reference trigger from non-reference trigger attribute, indicating whether the reference trigger for the respective device is from a non-reference trigger from another respective device.

Example trigger clock attributes may include a trigger clock synchronization pulse source attribute, specifying a source of a synchronization pulse; a trigger clock synchronization pulse output terminal attribute, specifying a destination of the synchronization pulse; and a trigger clock minimum period attribute, specifying a minimum period for the trigger clock. In a further embodiment, the set of attributes for each of the plurality of devices may also include a sample clock delay attribute, specifying a delay for a sample clock of a respective one of the plurality devices relative to others of the plurality of devices, among others. In one embodiment, the plurality of functions may include access functions for each of the plurality of attributes, e.g., "set" and "get" functions, as are well known in the art, whereby each attribute may be read or written.

In one embodiment, the configuration function may comprise a configuration for homogeneous triggers function that is executable to configure attributes related to synchronization of devices with homogeneous triggers. For example, the configuration for homogeneous triggers function may be executable to configure one or more reference clocks, one or more start triggers, one or more reference triggers, one or more script triggers, and/or one or more pause triggers, e.g., the function may configure sessions that support these triggers to share them. In a preferred embodiment, the devices with homogeneous triggers are comprised in a single chassis, e.g., the devices may be PXI instrumentation boards in a single PXI chassis. For example, in one embodiment where the instruments are comprised in a PXI chassis, if internal sample clocks are used and a reference clock source is not configured (or is set to "none"), this function may configure the reference clock source to be the 10 MHz PXI backplane clock, the PXI_Clk10, as mentioned above.

In one embodiment, if the configuration function cannot perform all the steps appropriate for the given sessions, it returns an error, in which case, specific instrument driver functions may be used for signal routing, and the trigger attributes described above set to specify the synchronization for the system.

Thus, in one embodiment, the configuration function may operate to configure attributes related to T Clock synchronization of sessions with homogeneous triggers.

In one embodiment, at least a subset of the plurality of functions may be operable to synchronize sessions with homogeneous and/or heterogeneous triggers, e.g., the synchronize function, the initiate function, the done function, and the wait until done function, and optionally, the get error description function, and the get extended error information function, among others. In one embodiment, the synchronize function may operate to synchronize T Clocks in the sessions (that support T Clock synchronization). Thus, after this function completes, T Clocks of all sessions are preferably synchronized. For example, the synchronize function may receive a sessions array and a session count, as well as a minimum T Clock period, indicating minimal period of T Clock, e.g., expressed in seconds. In one embodiment, valid values for this minimum period are between 0.0 and 1000.0. For example, a minimal T Clock period for a single chassis may be approximately 200 nanoseconds. In one embodiment, the system may automatically coerce the parameter to this value if the specified value is outside this valid range. For multi-chassis synchronization, this value may be adjusted to account for propagation delays through various modules (devices) and cables.

In various embodiments, the API may be implemented in a text-based language, e.g., C, C++, JAVA, etc., and so the functions described above may be called from applications written in such text-based languages. In an alternate embodiment, the API may be implemented in a graphical programming language, e.g., LabVIEW (G), provided by National Instruments Corporation. Thus, various graphical programming nodes may be provided, e.g., in a synchronization palette, for selection by a user, where the selected nodes may be included in a graphical program or block diagram to synchronize devices, e.g., for a measurement task or application.

The API may substantially reduce the number of calls or nodes required in an application to synchronize multiple devices, and thus may greatly simplify synchronization from the perspective of the user.

BRIEF DESCRIPTION OF THE DRAWINGS

A better understanding of the present invention can be obtained when the following detailed description of the preferred embodiment is considered in conjunction with the following drawings, in which:

FIG. 3A illustrates a computer system operable to execute a graphical program according to an embodiment of the present invention;

FIG. 7 is a table summarizing functions and attributes of the API, according to one embodiment;

Figure 1:
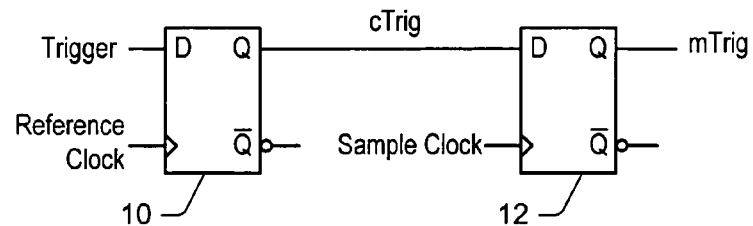
FIG. 1 illustrates an exemplary prior art circuit used to transfer a trigger signal from a reference clock domain to a sample clock domain.
Figure 2:
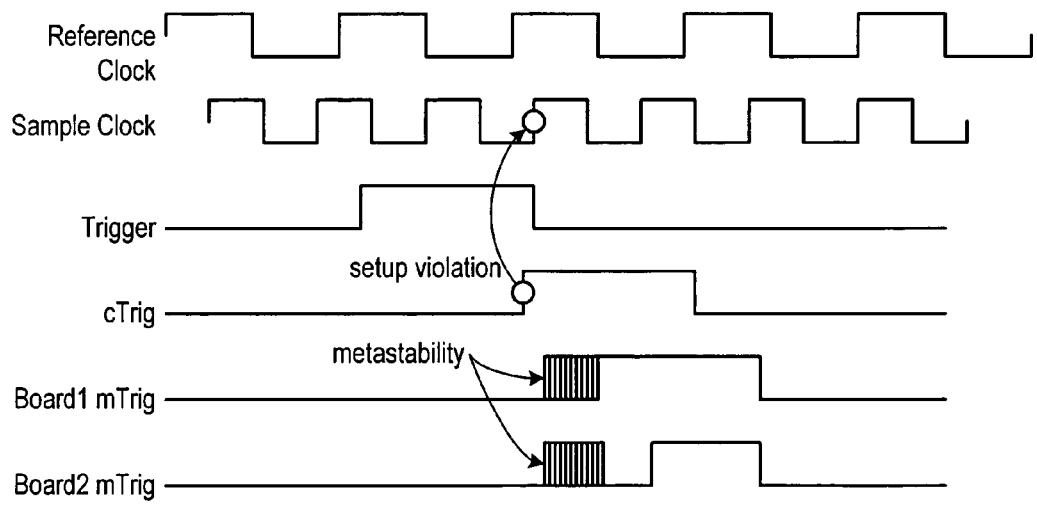
FIG. 2 is a timing diagram illustrating how two devices with sample clocks that are in phase may see the same trigger signal in different sample clock cycles.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 10/260,597 titled "System and Method for Synchronizing Multiple Instrumentation Devices", filed Sep. 30, 2002.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, Vis Sim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, Vis Sim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data, and/or to provide stimulistimulistimulus functions, e.g., to stimulate an external system. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Session—a run-time instance of a data structure that provides context for communicating and interacting with a particular physical device or instrument, a portion or subset of a physical device or instrument, or a collection of physical devices or instruments.

FIG. 3A—Computer System

FIG. 3A illustrates a computer system 82 suitable for implementing various embodiments of the present invention. For example, the computer system 82 may store program instructions implementing an API for synchronizing a plurality of devices or instruments in a system. In one embodiment, the API may be used in or invoked from a graphical program. As shown in FIG. 3A, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more graphical programs which are executable to perform the methods described herein. Also, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 3B:
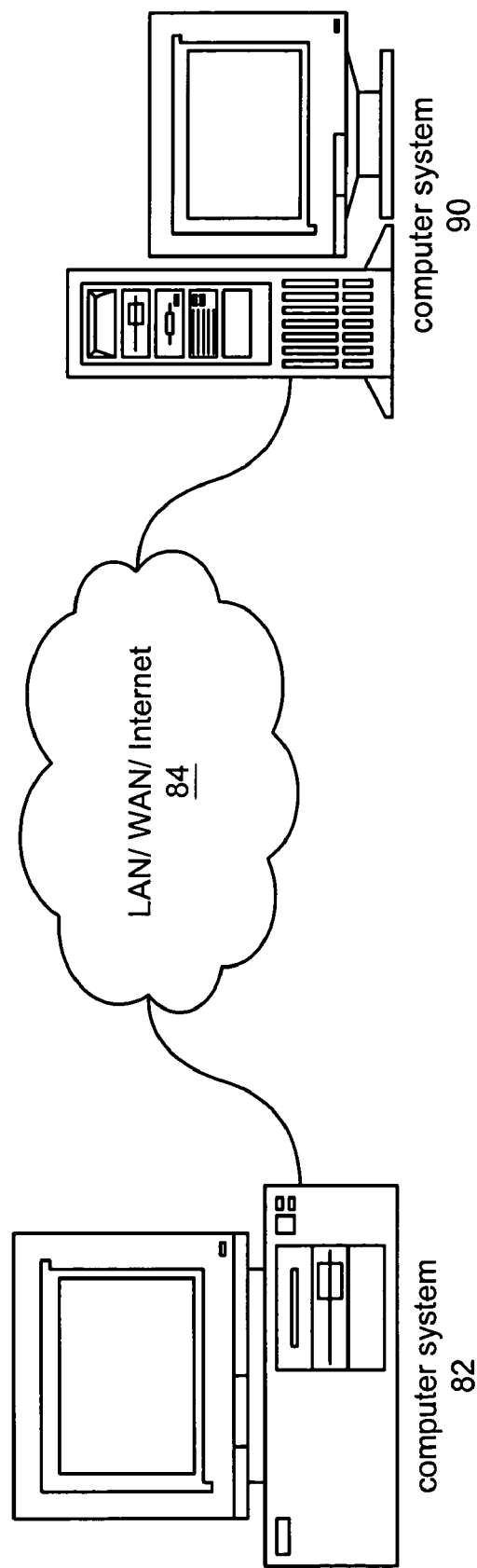
FIG. 3B illustrates a network system comprising two or more computer systems that may implement an embodiment of the present invention.

FIG. 3B—Computer Network

FIG. 3B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 4A:
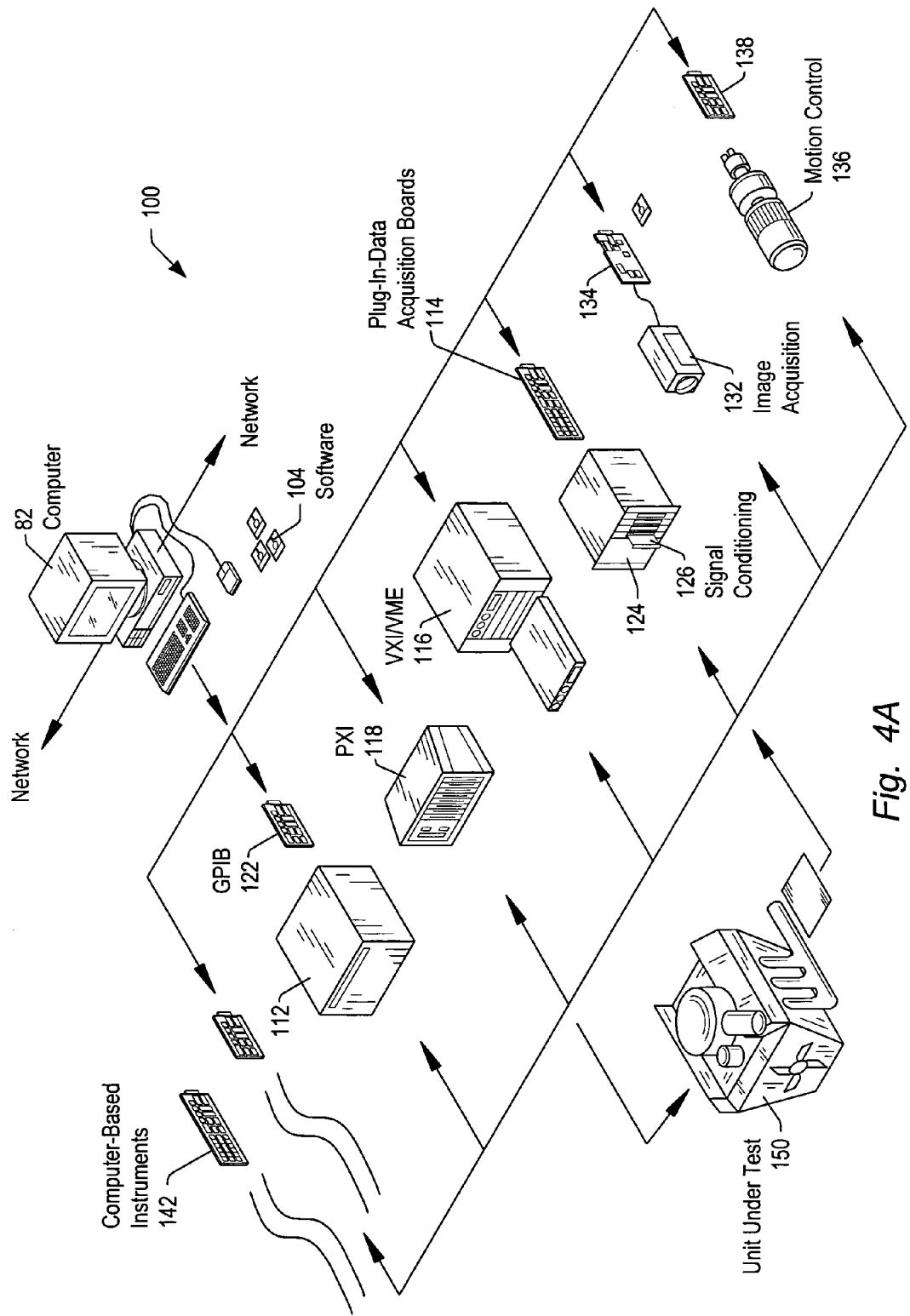
FIG. 4A illustrates an instrumentation control system according to one embodiment of the invention.

FIG. 4A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 4B:
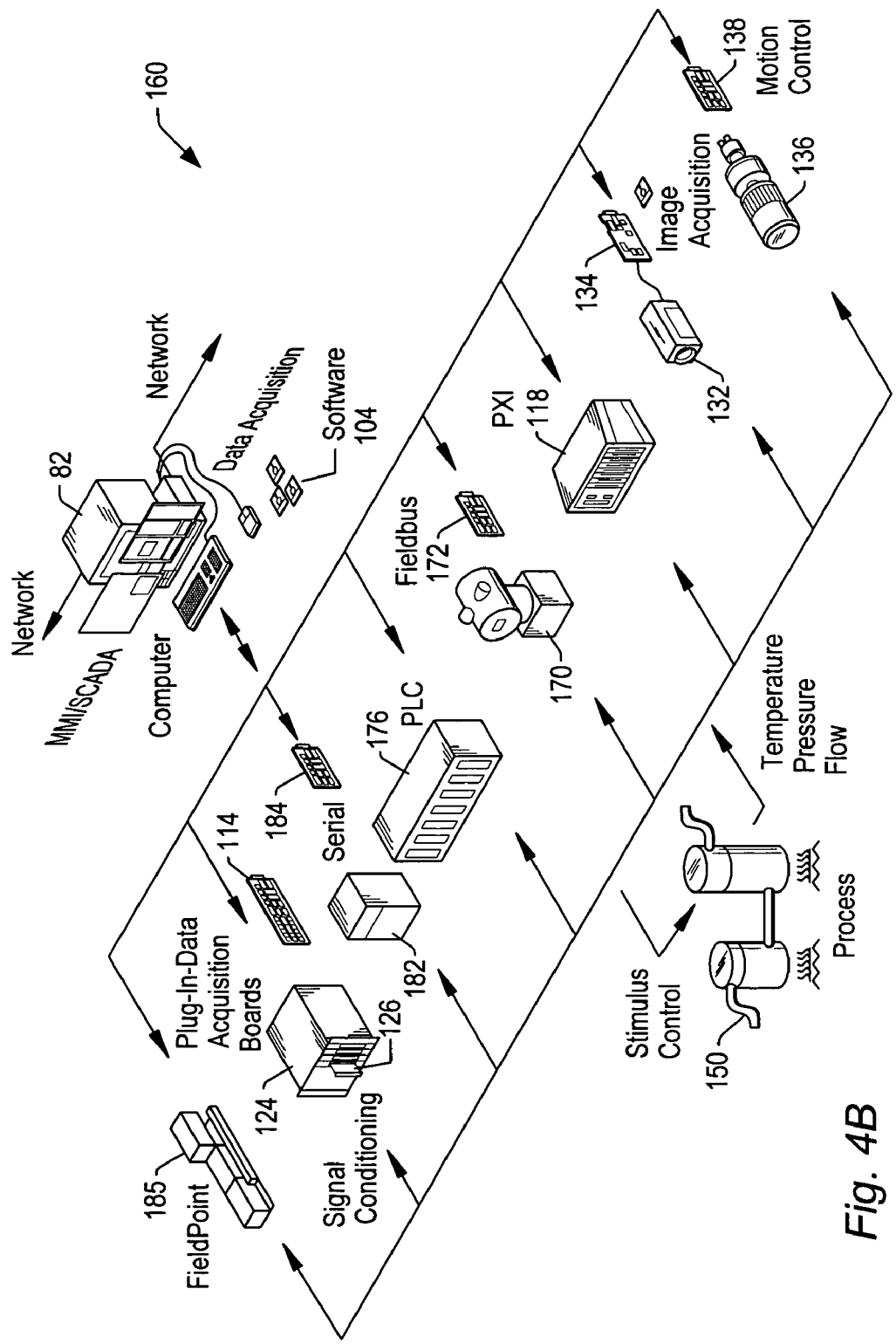
FIG. 4B illustrates an industrial automation system according to one embodiment of the invention.

FIG. 4B illustrates an exemplary industrial automation system 160 which may implement embodiments of the invention. The industrial automation system 160 is similar to the instrumentation or test and measurement system 100 shown in FIG. 4A. Elements which are similar or identical to elements in FIG. 4A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 5A:
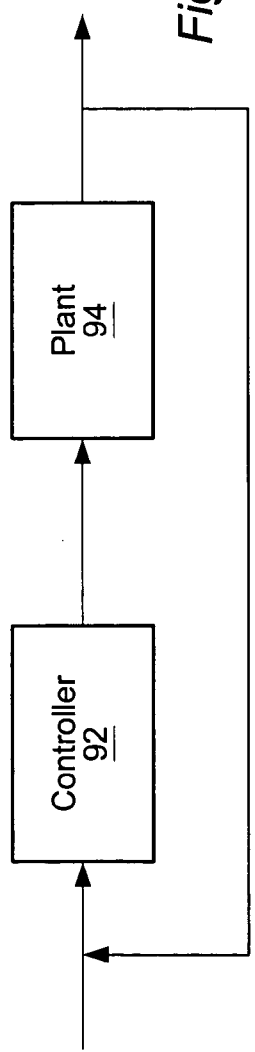
FIG. 5A is a high level block diagram of an exemplary system which may execute or utilize graphical programs.

FIG. 5A is a high level block diagram of an exemplary system which may execute or utilize graphical programs. FIG. 5A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 5B:
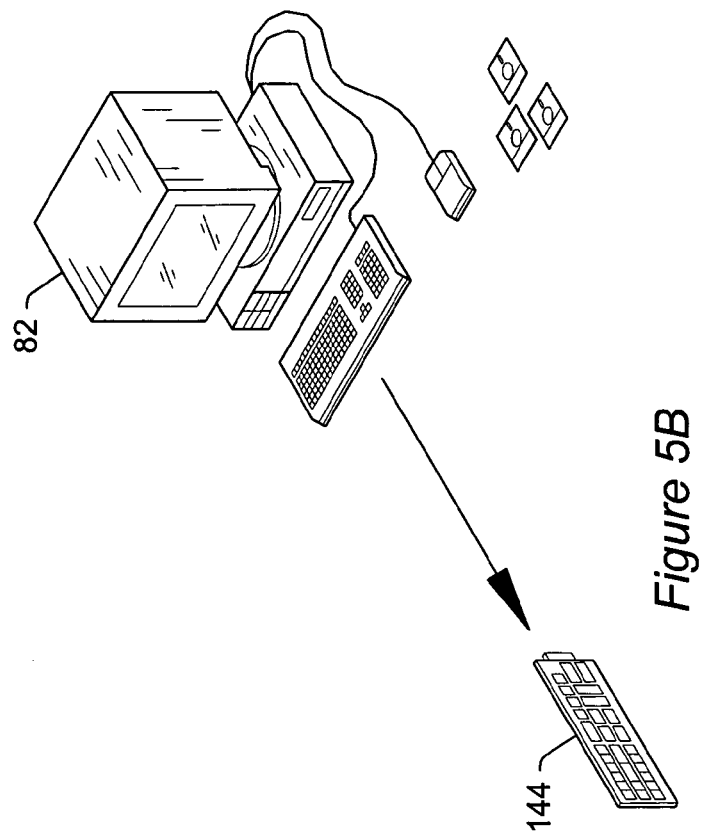
FIG. 5B illustrates an exemplary system which may perform control and/or simulation functions utilizing graphical programs.

FIG. 5B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 4A, 4B, and 5B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 4A and 4B, may be referred to as virtual instruments.

Figure 6:
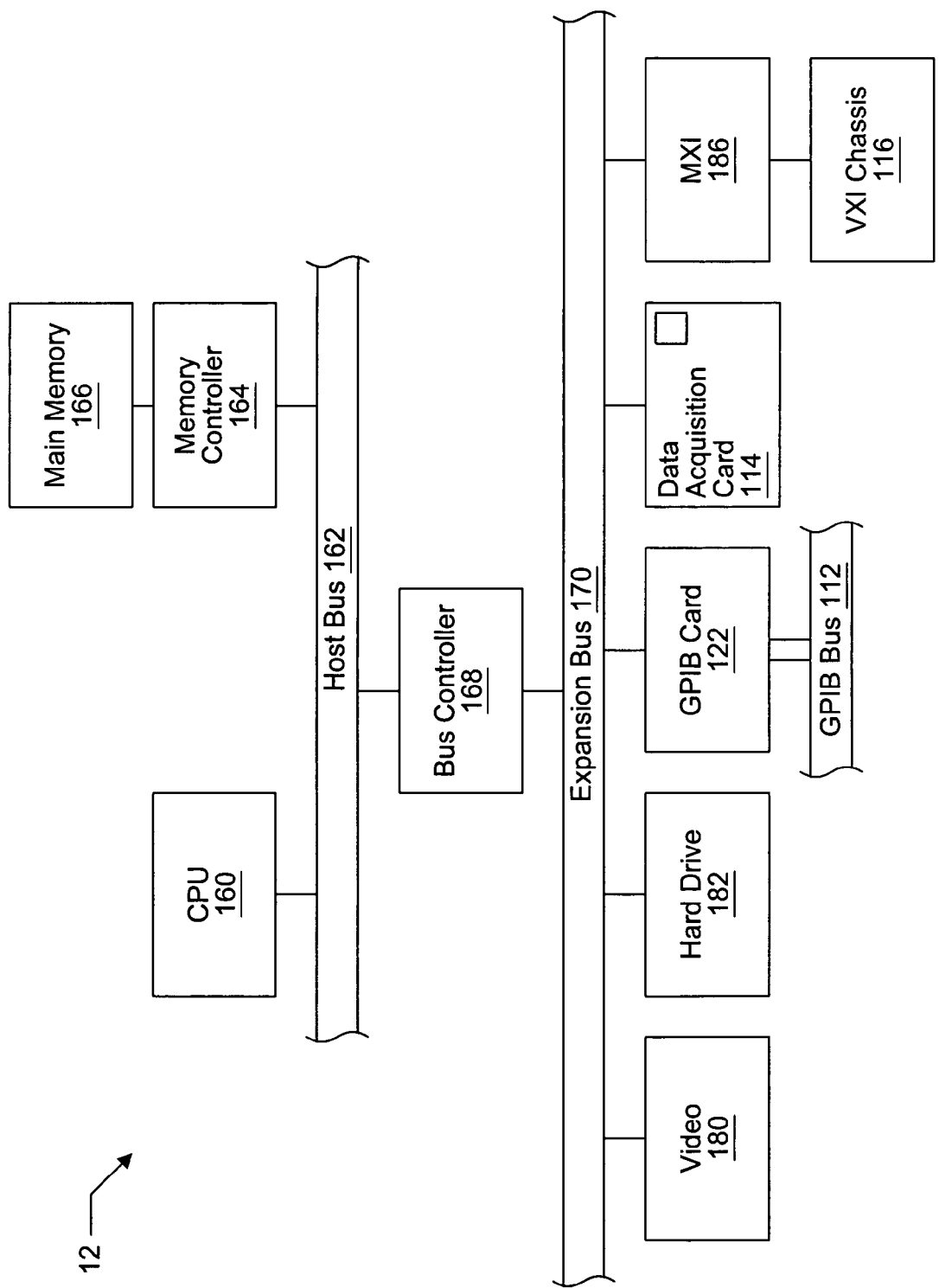
FIG. 6 is an exemplary block diagram of the computer systems of FIGS. 3A, 3B, 4A and 4B and 5B.

FIG. 6—Computer System Block Diagram

FIG. 6 is a block diagram representing one embodiment of the computer system 82 and/or 90 illustrated in FIGS. 3A and 3B, or computer system 82 shown in FIG. 4A or 4B. It is noted that any type of computer system configuration or architecture can be used as desired, and FIG. 6 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store program instructions, e.g., text-based or graphical, implementing an application programming interface (API) for synchronizing multiple devices, e.g., instruments, in a system, e.g., a system for measurement, control, automation, simulation, etc. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above.

The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a program, e.g., a graphical program, to the device 190 for execution of the program on the device 190. The deployed program may take the form of text-based code or graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

API for Multi-Instrument Synchronization

As noted above, it is often desirable to synchronize multiple devices in a system. Various embodiments of the present invention comprise an API (application programming interface) for specifying and performing such multi-device synchronization. More specifically, a plurality of functions may be provided which are invocable to allow instruments, e.g., high-speed modular instruments, to respond substantially simultaneously to external triggers. For example, in various embodiments, the API may facilitate synchronization of modular instruments (boards) in single or multiple chassis, e.g., PXI chassis; when same or different triggers are shared, e.g., a start trigger from one device used as a start trigger on another device, or a start trigger from one device used as a reference trigger by another device; and/or when sample clock rates for the devices are equal or different.

As noted above, the term "session" refers to a run-time instance of a data structure that provides context for communicating and interacting with a particular physical device or instrument, a portion or subset of a physical device or instrument, or a collection of physical devices or instruments.

In one embodiment, one or more of the functions may be different from typical instrument driver functions in that they may access or interact with multiple device drivers rather than one at a time. For example, one or more of the functions may take an array of device (also referred to as session) references (as opposed to individual devices or sessions) as an argument.

In a preferred embodiment, the plurality of functions may be invocable from a program to implement a multi-device synchronization scheme based on a trigger clock signal, referred to as a T Clock, a periodic signal used for trigger transmission. Note that in a preferred embodiment, T Clock is not shared by the devices, but instead is generated by each instrument from its reference or sample clock. In order for T Clocks to be generated in this manner, synchronized instruments preferably have a common reference clock (in case of internal sample clocks) or a common sample clock (in case of external sample clocks). Further details of this approach to synchronization are provided below. For additional information regarding T Clock synchronization, please see co-pending U.S. patent application Ser. No. 10/260,592, titled "System and Method for Synchronizing Multiple Instrumentation Devices", filed Sep. 30, 2002, which was incorporated by reference above.

T Clock Synchronization

As noted above, in a preferred embodiment, the synchronization scheme implemented by the API presented herein is based on a trigger clock, and is referred to as T Clock synchronization.

Homogeneous Triggers

Devices are considered to have homogeneous triggers when all triggers supported by those devices that can be T Clock synchronized are shared. For example, in one embodiment, the following triggers may be T Clock synchronized:

Start trigger for acquisitions and generations, where generations refers to signal generation;

Reference trigger (applies to acquisitions only);

Script trigger (applies to generations only); and

Pause trigger for generations.

Note that in one embodiment, other triggers that may be available on modular instruments, including pause triggers for acquisitions, may not be T Clock synchronized.

For example, if sessions A and B support only start triggers, and the start trigger from A is used as a start trigger by B, then A and B have homogeneous triggers. As another example, if session A supports only start triggers, and session B supports both start and reference triggers, then if the start trigger from A is used as a start trigger by B, then A and B have homogeneous triggers because all triggers supported by A and B that can be T Clock synchronized (in this case, only the start trigger) are shared.

Heterogeneous Triggers

Modular instrument sessions are considered to have heterogeneous triggers when they do not have homogeneous triggers.

For example, if session A supports only start trigger, and session B supports start and reference triggers, and if the start trigger from A is used as a reference trigger by B, and the start trigger for B is not related to A, then A and B are considered to have heterogeneous triggers because their start triggers are not shared.

Sync Pulse and Sync Pulse Clock

In one embodiment, a sync pulse may be used to synchronize T Clocks on different instruments, where the sync pulse is preferably produced by one of the synchronized instruments and sent to other instruments in the system. If all of the instruments are in one chassis, a function, e.g., a synchronize function, described below, may route this signal automatically, assuming that a trigger line (e.g., a PXI trigger line) is available for this routing.

If the plurality of instruments are in different chassis, the user may need to route this signal. For example, assume that chassis A contains the instrument exporting this signal and is connected via slot 2 controllers to chassis B and C. In one embodiment, the preferred routing sequence may be:

Route the signal from the instrument exporting this signal to a slot 2 controller using a PXI trigger line (let's call it line X);

Resynchronize to PXI_Clk10 in the slot 2 controller and route to another PXI trigger line in the same chassis (let's call it line Y, where Y is different from X) and to slot 2 controller in chassis B and C;

Program instruments in chassis A to receive the signal from PXI trigger line Y;

Route the signal without re-synchronizing using slot 2 controllers on chassis B and C to PXI Trigger line Y on those chassis; and Program instruments in chassis B and C to receive the signal from PXI trigger line Y.

In a preferred embodiment, the user should ensure that delays on wires used for routing the signal between the chassis are not excessive, e.g., that there is less than 100 ns of delay on the wires used for routing the signal between the chassis.

In one embodiment, a sync pulse clock signal may also be used for synchronization of T Clocks on different instruments. For example, in a PXI system, the sync pulse signal is preferably provided on a PXI_Clk10 line and is preferably a 10 MHz signal. In one embodiment, a function, e.g., the synchronize function, may route this signal automatically. If the instruments are in different chassis, all PXI_Clk10 signals in the chassis are preferably driven from the same clock source. Matched-length cables may be used to drive PXI_Clk10 on different chassis to minimize phase differences between the chassis, as is well known in the art.

Thus, in one embodiment, the API may include a plurality of functions for specifying and performing synchronization among a plurality of devices or instruments in a system, where the functions are executable to create and/or manage various clock and trigger signals in synchronizing the devices. Said another way, the plurality of functions may be invocable in a program to synchronize a plurality of devices, where each function is executable to perform a respective functionality related to synchronizing the plurality of devices. In a preferred embodiment, at least one of the plurality of functions is executable to access a plurality of instrument drivers corresponding respectively to the plurality of devices to synchronize the plurality of devices. In one embodiment, the plurality of functions may be executable to determine a trigger clock signal (T Clock) for each of the plurality of devices, and synchronize the plurality of devices based on the determined trigger clock signals, as described in more detail below.

Additionally, in one embodiment, in addition to the plurality of functions, the API may also include a plurality of attributes, each attribute corresponding to a respective property of the system related to synchronization of the plurality of devices, where each attribute is configurable to specify the respective property.

One embodiment of the plurality of functions and attributes is described below, although it should be noted that this particular embodiment of the API is meant to be exemplary only, and is not intended to limit the API to any particular set of functions, attributes, or functionality.

Synchronization Functions and Attributes

In one embodiment, the plurality of functions may include a synchronize function, executable to synchronize the trigger clock signals for the plurality of devices, and zero or more of: a configuration function, executable to configure at least a subset of the plurality of attributes for synchronization of the plurality of devices; an initiate function, executable to initiate synchronous operation of the plurality of devices; a done function, executable to monitor the operation of the plurality of devices; and a wait until done function, executable to indicate when operation of the plurality of devices is done. In one embodiment, the plurality of functions may further include one or more of: a get error description function, executable to provide an error description, e.g., based on an error code; and a get extended error information function, executable to provide extended error information for an error, e.g., the most recent error detected. Other functions may also be included in the API as desired to facilitate the synchronization process, such as, for example, set/get functions for synchronization attributes, described below, and so forth.

As mentioned above, in one embodiment, the API may also include a plurality of attributes, where each attribute corresponds to a respective property of the system related to synchronization of the plurality of devices, and where each attribute is configurable to specify the respective property. In a preferred embodiment, the plurality of attributes includes a set of attributes for each respective device of the plurality of devices. In other words, each of the plurality of devices may have a respective set of attributes specifying synchronization for the device and/or the system. For example, in one embodiment, the set of attributes for each respective device of the plurality of devices may include one or more trigger attributes and/or one or more trigger clock attributes, among others.

In one embodiment, the one or more trigger attributes may include one or more of: a start trigger master session attribute (e.g., TCLK_ATTR_START_TRIG_MASTER_SESSION), specifying which of the plurality of devices provides a start trigger; a reference trigger master session attribute (e.g., TCLK_ATTR_REF_TRIG_MASTER_SESSION), specifying which of the plurality of devices provides a reference trigger; a script trigger master session attribute (e.g., TCLK_ATTR_SCRIPT_TRIG_MASTER_SESSION), specifying which of the plurality of devices provides a script trigger; a pause trigger master session attribute (e.g., TCLK_ATTR_PAUSE_TRIG_MASTER_SESSION), specifying which of the plurality of devices provides a pause trigger; and a reference trigger from non-reference trigger attribute (e.g., TCLK_ATTR_REF_TRIG_IS_FROM_NON_REF_TRIG), indi that the reference trigger for the respective device is from a non-reference trigger from another respective device.

In one embodiment, the one or more trigger clock attributes may include one or more of: a trigger clock synchronization pulse source attribute (e.g., TCLK_ATTR_SYNC_PULSE_SRC), specifying a source of a synchronization pulse; a trigger clock synchronization pulse output terminal attribute (TCLK_ATTR_EXPORT_SYNC_PULSE_OUTPUT_TERM), specifying a destination of the synchronization pulse; and a trigger clock minimum period attribute (e.g., TCLK_ATTR_TCLK_MIN_PERIOD), specifying a minimum period for the trigger clock. In a further embodiment, the set of attributes for each of the plurality of devices may also include a sample clock delay attribute (e.g., TCLK_ATTR_SAMP_CLK_DELAY), specifying a delay for a sample clock of a respective one of the plurality devices relative to others of the plurality of devices, among others. As mentioned above, in one embodiment, the plurality of functions may include access functions for each of the plurality of attributes, e.g., "set" and "get" functions, as are well known in the art, whereby each attribute may be read or written. Further details of these exemplary attributes are provided below.

Example Functions: Homogeneous Triggers

In one embodiment, the configuration function comprises a configuration for homogeneous triggers function which is executable to configure attributes related to synchronization of devices with homogeneous triggers. For example, the configuration for homogeneous triggers function may be executable to configure one or more reference clocks, one or more start triggers, one or more reference triggers, one or more script triggers, and/or one or more pause triggers. In a preferred embodiment, the devices with homogeneous triggers are comprised in a single chassis, e.g., the devices may be PXI instrumentation boards in a single PXI chassis.

Thus, in one embodiment, the configuration for homogeneous triggers function (e.g., TClk_ConfigureForHomogeneousTriggers) may configure attributes commonly required for T Clock synchronization of sessions with homogeneous triggers, e.g., for synchronizing several modular instrument sessions with homogeneous triggers in a single PXI chassis.

In one embodiment, the configuration for homogeneous triggers function may operate to configure reference clocks if they are needed. In one embodiment where the instruments are comprised in a PXI chassis, if internal sample clocks are used and a reference clock source is not configured (or is set to "none"), this function may configure the reference clock source to be the 10 MHz PXI backplane clock, the PXI_Clk10, as mentioned above.

In one embodiment, the configuration for homogeneous triggers function may also operate to configure start triggers. For example, in one embodiment, if the start triggers are set to "none" for all sessions, the sessions may be configured to share the start trigger, e.g., by implicitly exporting start trigger from the one session, configuring the other sessions for digital edge start triggers with sources corresponding to the exported start trigger, and by setting the start trigger master session (e.g., NITCLK_ATTR_START_TRIG_MASTER_SESSION) appropriately for all sessions. Alternatively, if the start triggers are set to "none" for all except one session, this function may configure the sessions to share the start trigger from the one exceptional session. For example, in one embodiment, the function may implicitly export a start trigger from the session whose start trigger is not "none", configure the other sessions for digital edge start triggers with sources corresponding to the exported start trigger, and set the relevant attribute, e.g., NITCLK_ATTR_START_TRIG_MASTER_SESSION, appropriately for all sessions.

In one embodiment, the configuration for homogeneous triggers function may also operate to configure reference triggers. For example, in one embodiment, the function may configure sessions that support reference triggers to share them. For example, if reference triggers are "none" for all but one session, the function may implicitly export a reference trigger from the session whose reference trigger is not "none", configure the other sessions (that support reference triggers) for digital edge reference triggers with sources corresponding to the exported reference trigger, and set the relevant attributes, e.g., TCLK_ATTR_REF_TRIG_MASTER_SESSION and TCLK_ATTR_REF_TRIG_IS_FROM_NON_REF_TRIG, appropriately for all that support reference triggers.

In one embodiment, the configuration for homogeneous triggers function may also operate to configure script triggers, e.g., in one embodiment, the function may configure sessions that support script triggers to share them. For example, if the script triggers are set to "none" for all but one session, the function may implicitly export a script trigger from the session whose script trigger is not "none", configure the other sessions (that support script triggers) for digital edge script triggers with sources corresponding to the exported script trigger, and set the relevant attribute, e.g., TCLK_ATTR_SCRIPT_TRIG_MASTER_SESSION, appropriately for all sessions that support script triggers.

In one embodiment, the configuration for homogeneous triggers function may also operate to configure pause triggers, e.g., in one embodiment, the function may configure sessions that support pause triggers to share them. For example, if the pause triggers are set to "none" for all but one session, the function may implicitly export a pause trigger from the session whose pause trigger is not "none", configure other sessions (that support pause triggers) for digital edge pause triggers with sources corresponding to the exported pause trigger, and set the relevant attribute, e.g., TCLK_ATTR_PAUSE_TRIG_MASTER_SESSION, appropriately for all sessions that support script triggers. Note that in some embodiments, T Clock synchronization may not be supported for pause triggers on acquisition sessions.

In one embodiment, if the configuration function cannot perform all the steps appropriate for the given sessions, it returns an error, in which case, specific instrument driver functions may be used for signal routing, and the trigger attributes described above set to specify the synchronization for the system.

The following is an example C-language prototype for the configuration function, according to one embodiment:

```
ViStatus TClk_ConfigureForHomogeneousTriggers
    (ViUInt32 sessionCount, ViInt32 sessions[ ]);
``` where the input parameters for the function are (as shown) sessions [ ], an array of T Clock session references, and sessionCount, indicating the number of elements in the sessions array.

Thus, in one embodiment, the configuration function may operate to configure attributes related to T Clock synchronization of sessions with homogeneous triggers. In one embodiment, others of the plurality of functions may operate to synchronize sessions with homogeneous and/or heterogeneous triggers, examples of which are described below.

Example Functions: Homogeneous and/or Heterogeneous Triggers

In one embodiment, at least a subset of the plurality of functions may be operable to synchronize sessions with homogeneous and/or heterogeneous triggers, e.g., the synchronize function, the initiate function, the done function, and the wait until done function, and optionally, the get error description function, and the get extended error information function, among others.

In one embodiment, the synchronize function (e.g., TClk_Synchronize) may operate to synchronize T Clocks in the sessions (that support T Clock synchronization). Thus, after this function completes, T Clocks of all sessions are preferably synchronized.

The following is an example C-language prototype for the synchronize function, according to one embodiment:

```
ViStatus TClk_Synchronize
    (ViUInt32 sessionCount, ViInt32 sessions[ ],
    ViReal64 minTClkPeriod);
``` where the input parameters for the function are (as shown) the sessions[ ] array and sessionCount, as described above, with the additional parameter minTClkPeriod, indicating a minimal period of T Clock, e.g., expressed in seconds. In one embodiment, valid values for this minimum period are between 0.0 and 1000.0. For example, a minimal T Clock period for a single chassis may be approximately 200 nanoseconds. In one embodiment, the system may automatically coerce minTClkPeriod to this value if the specified value is outside this valid range. For multi-chassis synchronization, this value may be adjusted to account for propagation delays through various modules (devices) and cables.

In one embodiment, the initiate function (e.g., TClk_Initiate) may start acquisition or generation for the sessions, taking into consideration any special requirements for synchronization.

The following is an example C-language prototype for the initiate function, according to one embodiment:

```
ViStatus TClk_Initiate
    (ViUInt32 sessionCount, ViInt32 sessions[ ]);
``` where the input parameters for the function are (as shown) the sessions[ ] array and sessionCount, as described above.

In one embodiment, the done function (e.g., TClk_IsDone) may monitor the progress of acquisitions and/or generations for the sessions.

The following is an example C-language prototype for the done function, according to one embodiment:

```
ViStatus TClk_IsDone
    (ViUInt32 sessionCount, ViInt32 sessions[ ],
    ViBoolean* done);
``` where the input parameters for the function are (as shown) the sessions[ ] array and sessionCount, as described above, and where the output parameter is the Boolean variable done, indicating whether the operation is done, e.g., when each of the sessions is done without any errors, or when any one of the sessions reports an error.

In one embodiment, the wait until done function (e.g., TClk_WaitUntilDone) may wait until the acquisitions and/or generations for the sessions are done, returning when each of the sessions is done without any errors, or when any one of the sessions is done due to an error.

The following is an example C-language prototype for the wait until done function, according to one embodiment:

```
ViStatus TClk_WaitUntilDone
    (ViUInt32 sessionCount, ViInt32 sessions[ ],
    ViReal64 timeout);
``` where the input parameters for the function are (as shown) the sessions[ ] array and sessionCount, as described above, with the additional parameter timeout, indicating the amount of time the function waits for the sessions to be done (e.g., expressed in seconds). If timeout is exceeded, the function preferably returns an error.

In embodiments where error functions are provided, the get error description function (e.g., TClk_GetError String) may return an error description string, given an error code.

The following is an example C-language prototype for the get error description function, according to one embodiment:

```
ViStatus TClk_GetErrorString
    (ViInt32 errorCode, ViString errorString, ViUInt32
    errorStringSize);
``` where the input parameters for the function are (as shown) error Code, indicating which error has occurred, and errorStringSize, indicating the size of the error string, and where the output parameter for the function is errorstring, providing a description of the error. In one embodiment, if errorstring is NULL, then the return value of the function is the string size needed in order for the function to be able to return the full error string. In one embodiment, if error StringSize is 0, then the return value of the function is the size needed in order for the function to be able to return the full error string.

In embodiments where error functions are provided, the get extended error information function (e.g., TClk_GetExtendedErrorInfo) may return extended error information for the most recent function that returned an error, although in another embodiment, the function may return extended error information based on an error code.

The following is an example C-language prototype for the get extended error information function, according to one embodiment:

```
ViStatus TClk_GetExtendedErrorInfo
    (ViString errorString, ViUInt32 errorStringSize);
``` where the input parameter for the function is error StringSize, indicating the size of the error string, as described above, and where the output parameter for the function is errorstring, providing an extended description of the error. As also described above, in one embodiment, if errorstring is NULL, then the return value of the function is the string size needed in order for the function to be able to return the full error string. In one embodiment, if error StringSize is 0, then the return value of the function is the size needed in order for the function to be able to return the full error string.

Example Attributes

As noted above, the attributes included in the API are preferably on a per session basis, i.e., each session has an associated set of attributes. Below are more detailed descriptions of the exemplary attributes mentioned above.

```
TCLK_ATTR_SYNC_PULSE_SRC
```

In one embodiment, the TCLK_ATTR_SYNC_PULSE_SRC attribute (or equivalent) is used to specify the source of the sync pulse, and may be used primarily when synchronizing a multi-chassis system. Access for the attribute is read/write, and in one embodiment, the attribute has a string data type (e.g., ViString) for reading, and a constant string data type (e.g., ViConstString) for writing.

In one embodiment, for example, iin a PXI implementation, the attribute may specify the sync pulse source with the following values: for a module in any slot connected to the PXI backplane, "PXI_Trig0" through "PXI_Trig7"; in addition, for modules in slots 3 through 15 of the PXI chassis, "PXI_Star".

In one embodiment, front panel connections may be device specific. For example, the following PXI boards from National Instruments may be associated with the following values: NI PXI-5122 supports "PFI0" and "PFI1"; NI PXI-5421 supports "PFI0", "PFI1", "PFI2", and "PFI3"; and NIPXI-6551 and NIPXI-6552 support "PFI0", "PFI1", "PFI2", and "PFI3".

In one embodiment, the TCLK_ATTR_SYNC_PULSE_SRC attribute has a default value, e.g., the empty string, indicating to the TClk_Synchronize function to initialize this attribute when all synchronized modules are in one PXI chassis. To synchronize a multi-chassis system, this attribute should be set before calling the TClk_Synchronize function.

---
TCLK_ATTR_EXPORT_SYNC_PULSE_OUTPUT_TERM
---

In one embodiment, the TCLK_ATTR_SYNC_PULSE_TERM attribute (or equivalent) is used to specify the destination of the sync pulse, and may be used primarily when synchronizing a multi-chassis system. Access for the attribute is read/write, and in one embodiment, the attribute has a string data type (e.g., ViString) for reading, and a constant string data type (e.g., ViConstString) for writing.

In one embodiment, for example, in a PXI implementation, the attribute may specify the sync pulse destination with the following values: for a module in any slot connected to the PXI backplane, "PXI_Trig0" through "PXI_Trig7"; in addition, for modules in slots 3 through 15 of the PXI chassis, "PXI_Star". In other words, the attribute may specify that the sync pulse be exported to any of these PXI lines.

Similar to the sync pulse source designations above, in one embodiment, front panel connections may be device specific, and so, for example, the following PXI boards from National Instruments may be associated with the following values: NI PXI-5122 supports "PFI0" and "PFI1"; NI PXI-5421 supports "PFI0", "PFI1", "PFI4", and "PFI5 and NI PXI-6551 and NI PXI-6552 support "PFI0", "PFI1", "PFI2", and "PFI3".

In one embodiment, the TCLK_ATTR_SYNC_PULSE_TERM attribute has a default value, e.g., the empty string, indicating that the sync pulse signal is to be automatically routed for the user.

---
TCLK_ATTR_SAMP_CLK_DELAY
---

In one embodiment, the TCLK_ATTR_SAMP_CLK_DELAY attribute (or equivalent) is used to specify the delay to apply to the sample clock of a session relative to the other synchronized sessions. Access for the attribute is read/write, and in one embodiment, the attribute has a 64 bit real data type (e.g., ViReal64).

The value of the attribute is preferably expressed in seconds. During synchronization, the sample clocks on synchronized devices are preferably aligned. If any of the sample clocks are to be delayed, this attribute may be set prior to calling TClk_Synchronize to program the delay.

In one embodiment, valid values for this attribute lie between 0 and one period of sample clock, with an optional default value of zero.

---
TCLK_ATTR_START_TRIG_MASTER_SESSION
TCLK_ATTR_REF_TRIG_MASTER_SESSION
TCLK_ATTR_SCRIPT_TRIG_MASTER_SESSION
TCLK_ATTR_PAUSE_TRIG_MASTER_SESSION
---

In one embodiment, these attributes (or equivalents) may be used to specify a session that originally received the respective trigger (start, reference, or pause trigger), e.g., from the external world (e.g., from another system), or, in the case of software triggers or no external triggers, that generated the respective trigger. In other words, the attributes may be used to specify which of the sessions will provide the respective trigger for the other sessions. Access for the attribute is read/write, and in one embodiment, the attribute has a 32 bit integer data type (e.g., ViInt32).

---
TCLK_ATTR_REF_TRIG_IS_FROM_NON_REF_TRIG
---

In one embodiment, this attribute (or equivalent) may specify that the reference trigger for this session is coming from a non-reference trigger from another task. This attribute may be ignored if the session is the original receiver of the reference trigger. Access for the attribute is read/write, and in one embodiment, the attribute has a Boolean data type (e.g., ViBoolean).

In one embodiment, valid values for this attribute are false and true, with the value false indicating that the reference trigger is from or based on another reference trigger. The value false also applies when the session (associated with the attribute) is responsible the reference trigger. The value true indicates that the reference trigger is from or based on a trigger that is not a reference trigger, e.g., from a start trigger of another session. In one embodiment, the attribute may have a default value of false.

Attribute Access Functions

As noted above, in one embodiment, each of the plurality of attributes may have associated access functions for reading and writing the attributes, i.e., "get" and "set" functions, as are well known in the art. Below are exemplary versions of these access functions for a variety of data types.

TClk_SetAttributeViInt32

This function operates to set the value of a 32 bit integer (ViInt32) attribute. A C-language prototype for this function may have the following form:

---
```
ViStatus TClk_SetAttributeViInt32
    (ViInt32 session, ViConstString channelName, ViAttr
    attributeID, ViIn32 attributeValue);
```
--- where the input parameters include session, described above, channelName, attributeID, and attributeValue. If the attribute is channel-based, the channelName parameter specifies the name of the channel on which to set the value of the attribute. If the attribute is not channel-based, the parameter may be set to a null value, e.g., VI_NULL or an empty string. The default value is the empty string, " ". The parameter attributeID is an identifier (ID) for the attribute being set, and the parameter attributeValue is the value of the attribute written (set).

---
TClk_GetAttributeViInt32
---

This function operates to get the value of a 32 bit integer (ViInt32) attribute. A C-language prototype for this function may have the following form:

---
```
ViStatus TClk_GetAttributeViInt32
    (ViInt32 session, ViConstString channelName, ViAttr
    attributeID, ViIn32* attributeValue);
```
--- where the input parameters include session, channel-Name, and attributeID, as described above, but where the output parameter, attributeValue is a pointer to a 32 bit integer, used to return the value of the attribute.

Access functions similar to those above may be provided for any other data types used in the system, e.g.,

```
TClk_SetAttributeViReal64,
TClk_GetAttributeViReal64,
TClk_SetAttributeViBoolean,
TClk_GetAttributeViBoolean,
TClk_SetAttributeViString, and
TClk_GetAttributeViString, among others.
```

It should be noted that the attributes described above are meant to be exemplary only, and are not intended to limit the synchronization attributes to any particular set of attributes.

FIG. 7—Summary of Functions and Attributes

The table of FIG. 7 summarizes functions and attributes suitable for different scenarios, according to one embodiment. As FIG. 7 shows, three primary scenarios for synchronization are: 1) single chassis system with homogeneous triggers, 2) single chassis system with heterogeneous triggers, and 3) multiple chassis system. As indicated, in one embodiment, the ConfigureFor HomogeneousTriggers function is applicable only to the first scenario, while the remainder of the functions, e.g., Synchronize, Initiate, IsDone, WaitUntilDone, GetError String, and GetExtendedErrorInfo, apply to all three scenarios. As also indicated, the trigger attributes, START_TRIG_MASTER_SESSION, REF_TRIG_ORIGINAL_SESSION, SCRIPT_TRIG_MASTER_SESSION, PAUSE_TRIG_MASTER_SESSION, and REF_TRIG_IS_FROM_NON_REF_TRIG, are applicable to scenarios 2) and 3), while TCLK_SYNC_PULSE_SRC, TCLK_SYNC_PULSE_TERM, and TCLK_MIN_PERIOD, apply to scenario 3) only. Finally, in this embodiment, the attribute SAMP_CLK_DELAY is optional for all three scenarios. An exemplary implementation of the functionality accessed or invoked with the above API is described below with reference to FIGS. 11-18.

Example Synchronization Scenarios

Below are described several examples of synchronization using the above functions and attributes. Note that these examples are meant to be illustrative only, and are not intended to limit the invention to any particular implementation or functionality.

Example: Synchronization in a Single PXI Chassis with Homogeneous Triggers

If several modular instrument sessions with homogeneous triggers in a single PXI chassis are to be synchronized, TClk_ConfigureFor HomogeneousTriggers may be invoked to configure attributes required for this scenario and to arrange trigger sharing across sessions;

TClk_Synchronize may be invoked to synchronize T Clocks on the instruments comprised in the chassis (e.g., modular instruments or boards);

TClk_Initiate may be invoked to initiate acquisitions and/or generations corresponding to sessions;

TClk_IsDone may be invoked to monitor the progress of operations, or TClk_WaitUntilDone may be invoked to wait until the operation is done (these functions are optional); and TClk_GetExtendedErrorInfo and/or TClk_GetError String may be invoked to get information about any errors that may have occurred.

Example: Synchronization in a Single PXI Chassis with Heterogeneous Triggers

If several modular instruments with heterogeneous triggers in a single PXI chassis are to be synchronized, instrument driver functions for the various devices may be used to route triggers so they can be shared among the devices;

the following TClk attributes may be used to specify how triggers are shared between modular instruments:

```
TCLK_ATTR_START_TRIG_MASTER_SESSION
TCLK_ATTR_REF_TRIG_MASTER_SESSION
TCLK_ATTR_SCRIPT_TRIG_MASTER_SESSION
TCLK_ATTR_PAUSE_TRIG_MASTER_SESSION
TCLK_ATTR_REF_TRIG_IS_FROM_
   NON_REF_TRIG
```

TClk_Synchronize may be invoked to synchronize T Clocks on the devices;

TClk_Initiate may be invoked to initiate acquisitions and/or generations corresponding to sessions;

TClk_IsDone may be invoked to monitor the progress of operations or TClk_WaitUntilDone may be invoked to wait until the operation is done (these functions are optional); and TClk_GetExtendedErrorInfo and/or TClk_GetError String may be invoked to retrieve information about any errors that may have occurred.

Example: Synchronization in Multiple PXI Chassis

If several device in multiple PXI chassis with homogeneous or heterogeneous triggers are to be synchronized, instrument driver functions for the various devices may be used to route triggers so they can be shared among the devices;

the following TClk attributes may be used to specify how triggers are shared between modular instruments:

```
TCLK_ATTR_START_TRIG_MASTER_SESSION,
TCLK_ATTR_REF_TRIG_MASTER_SESSION,
TCLK_ATTR_SCRIPT_TRIG_MASTER_SESSION,
TCLK_ATTR_PAUSE_TRIG_MASTER_SESSION,
TCLK_ATTR_REF_TRIG_IS_FROM_
   NON_REF_TRIG, and
TCLK_ATTR_TCLK_MIN_PERIOD;
``` the following TClk attributes may be used to specify routing of the sync pulse:

```
TCLK_ATTR_SYNC_PULSE_SRC, and
TCLK_ATTR_EXPORT_SYNC_PULSE_OUTPUT_TERM;
```

TClk_Synchronize may be invoked to synchronize T Clocks on the devices;

TClk_Initiate to initiate acquisitions and/or generations corresponding to the sessions;

TClk_IsDone may be invoked to monitor the progress of operations or TClk_WaitUntilDone may be invoked to wait until the operation is done (these functions are optional); and

```
TClk_GetExtendedErrorInfo and/or TClk_GetErrorString may be
invoked to retrieve information about any errors that may have occurred.
```

Sample Clock Delay

As noted above, in one embodiment, the TCLK_ATTR_SAMP_CLK_DELAY may be used to delay a sample clock on one session relative to other sessions, if an internal sample clock is being used.

Example C Programs for Performing Synchronization

The following are example programs in C respectively illustrating synchronization of multiple instruments using prior art techniques and using an embodiment of the present API.

---

C Program Using Traditional API

```
#define sessionCount 10
// assume 10 sessions are being synchronized
int sessions[sessionCount];
double lockTime[sessionCount];
double lockConfirmTime[sessionCount];
double meas[sessionCount];
char syncCmnd[500];
int i;
statusWrap(traditional_dsgnCmndSession(session[0]));
statusWrap(traditional_getTimingEngineName(session[0], syncCmnd));
strcat(syncCmnd, "/syncCmnd");
for (i=0; i<numSessions; ++i)
    statusWrap(traditional_setSyncCmndSrc(session[i], syncCmnd));
for (i=0; i<numSessions; ++i)
{
    statusWrap(traditional_getPLLLockTime(session[i], lockTime[i]));
    statusWrap(traditional_getPLLLockConfirmTime(session[i],
lockConfirmTime[i]));
    statusWrap(traditional_prepareToResetPLL(session[i]));
}
statusWrap(traditional_issueResetPLLCmnd(session[0]));
wait(max(sessionCount, lockTime)); // assume wait and max functions are
available in some library
for (i=0; i<sessionCount; i++)
    statusWrap(traditional_issueWaitForPLLLockCmnd(session[i]));
wait(max(sessionCount, lockConfirmTime));
for (i=0; i<sessionCount; i++)
    statusWrap(traditional_checkPLLLocked(session[i]));
for (i=0; i<sessionCount; i++)
    statusWrap(traditional_prepareToStartTClkMeas(session[i]));
statusWrap(traditional_issueStartTClkMeasCmnd(session[0]));
for (i=0; i<sessionCount; i++)
    statusWrap(traditional_getTClkMeas(session[i], meas[i]));
for (i=0; i<sessionCount; i++)
    statusWrap(traditional_adjustTClk(session[i], max(sessionCount,
meas)));
for (i=0; i<numSessions; ++i)
    statusWrap(traditional_setSyncCmndSrc(session[i], ""));
```

---

C Program Using One Embodiment of the Present API

```
#define sessionCount 10
// assume 10 sessions are being synchronized
int sessions[sessionCount];
statusWrap(niTClk_Synchronize(sessionCount, sessions, 0.0));
```

---

Note that the functionality of virtually all of the explicit synchronization function calls has been subsumed in or invoked by a single call, i.e., the details of the synchronization process are handled automatically. Thus, the use of the present API may substantially simplify synchronization of multiple instruments.

Performance Optimization

In one embodiment, the performance of the system may be substantially improved if the synchronized devices or instruments in the system operate with unchanged sample clocks, where sample clocks are unchanged if none of the sample clock attributes are changed. Note that if sample clocks are derived from reference clocks, then none of the reference clock attributes are changed, and so the sample clocks remain unchanged. In this case, TClk_Synchronize may only need to be called once, and as long as sample clocks are identical, the devices will be synchronized. Note that in this case, the other functions may be called as many times as necessary. It should be noted that in general, caution is advised when optimizing performance of the system, as the synchronization process may not be able to detect any changes to sample clocks, and therefore no errors will be reported if the devices stop being synchronized due to a sample clock change.

Figure 8:
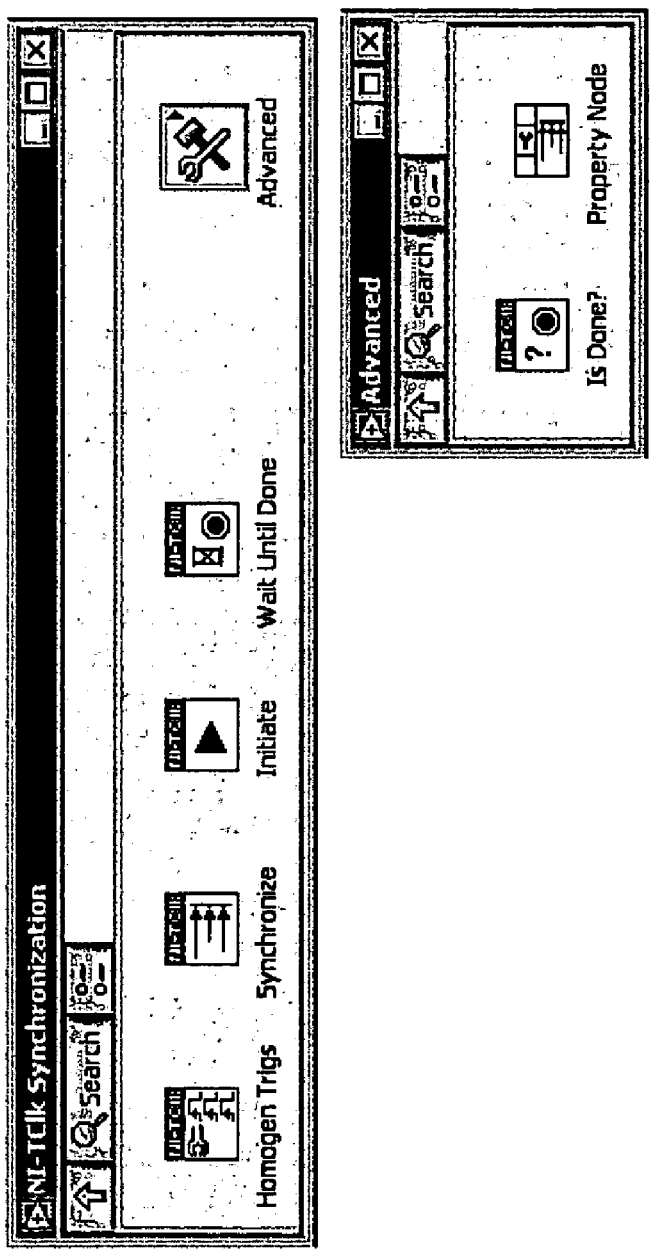
FIG. 8 illustrates a graphical version of the API, according to one embodiment.

FIG. 8—Graphical API

As mentioned above, in some embodiments, the API may be implemented as a graphical API, where the functions are represented or comprised in graphical program nodes, such as, for example, graphical program nodes in the LabVIEW graphical programming environment, provided by National Instruments Corporation. These nodes, i.e., synchronization nodes, may be included in a graphical program or block diagram where during execution of the graphical program the nodes execute to perform the functionality described above. Although the following graphical API is described in terms of LabVIEW, it should be noted that any other type of graphical programming system may be used to implement the API, as desired.

In one embodiment, graphical program nodes, also referred to as LabVIEW VIs, may correspond to the above C functions with the following changes:

English (as opposed to C) may be used for attribute, control, and indicator names;

Spaces may be used for word separation in node or VI names;

The parameter pair sessions, and sessionCount may be replaced by a sessions array, e.g., with a data type of "array of T Clock sessions" (a wire type);

A sessions out array output may be added to each node or VI;

Errors may be reported via an error in, error out mechanism provided by the graphical development environment, and so there may be no equivalents to the GetError String and GetExtendedErrorInfo functions; and The Get/Set Attribute functions may be replaced by a property node, e.g., a T Clock property node, whereby the attribute values may be accessed, i.e., read and/or written, as described below.

In one embodiment, the T Clock attributes may correspond to a property node in LabVIEW (or multiple property nodes) with the following observations and changes:

Main input on the property node may be called "session input" and the corresponding output may be called "dup session".

The data type for session input and session output, as well as for the four trigger attributes may be "T Clock session", while that of the sync pulse source and terminal attributes may be a string.

In one embodiment, the synchronization nodes may be organized and presented to a user in a palette. FIG. 8 illustrates one embodiment of a palette of nodes implementing one embodiment of the API. As FIG. 8 shows, nodes for each of the functions TClk_ConfigureFor HomogeneousTriggers, TClk_Synchronize, TClk_Initiate, TClk_IsDone and TClk_WaitUntilDone may be included in the palette, where each node is selectable for inclusion (e.g., via dragging and dropping) in a graphical program and executable to perform the corresponding functionality, described above. In one embodiment, this palette may present commonly used synchronization nodes for selection and inclusion by the user in graphical programs. Additionally, in one embodiment, additional synchronization nodes may also be provided, e.g., for advanced synchronization functionality. As FIG. 8 also shows, in this embodiment, an "Advanced" icon is also included in the palette, which may be selected by the user to invoke a palette of "advanced" synchronization nodes, here shown below the original palette. As shown, this advanced palette includes an "Is Done?" node, which may operate to return a Boolean value indicating completion (or not) or an operation, and a property node, through which the user (or program code) may access attributes, e.g., to "get" and/or "set" parameter values.

In one embodiment, the palette(s) of synchronization nodes may be represented by a palette icon or node in one or more other palettes, where selection of the palette icon or node may invoke display of the palette, from which the nodes may then be selected.

Figure 9A:
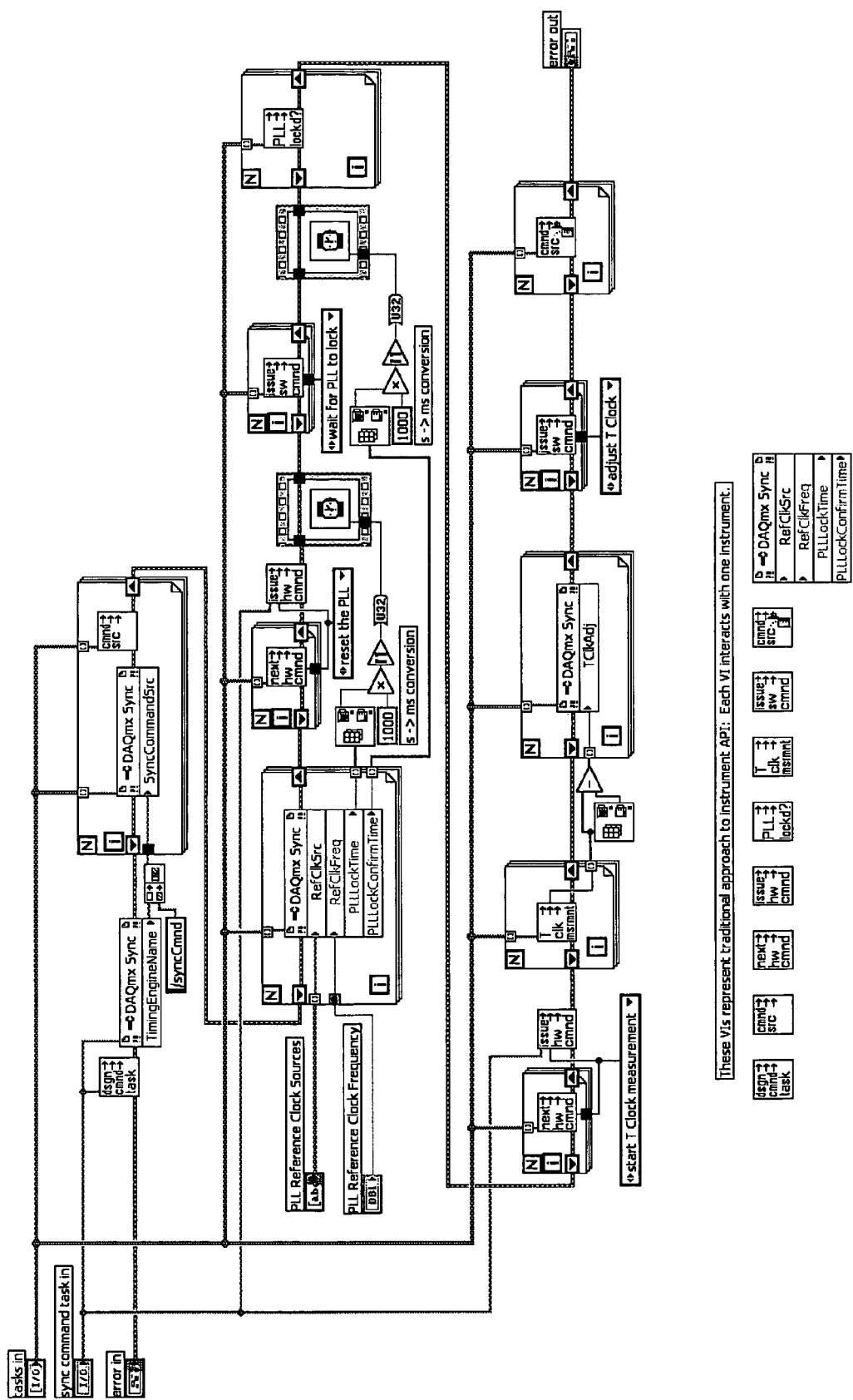
FIGS. 9A and 9B illustrate graphical programs using a prior art graphical API, and one embodiment of the present API, respectively.
Figure 9B:
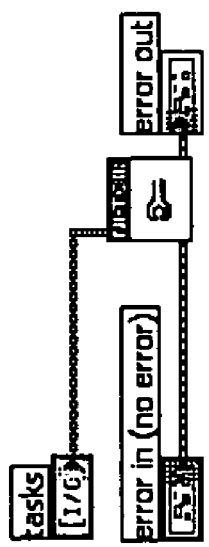

FIGS. 9A and 9B—Comparison of Graphical API with Prior Art

FIGS. 9A and 9B respectively illustrate an example synchronization application using prior art methods, and using one embodiment of the graphical API described herein. As described above, a primary feature of the present invention is that while traditional approaches to multiple device synchronization involve invoking or using the instrument drivers for the devices one at a time (and in a particular order), the present API operates on multiple devices at once, e.g., under a single function invocation. This difference in complexity is illustrated by FIGS. 9A and 9B.

FIG. 9A illustrates an example graphical program using a graphical API according to the prior art, where the program implements synchronization among a plurality of devices. As FIG. 9A shows, in the prior art approach, a plurality of synchronization nodes may be required, each corresponding to a respective device or instrument, and shown along the bottom of FIG. 9A. Thus, each node interacts with one instrument at a time. In a T Clock hardware synchronization scheme, this single device per node approach may entail a heavy burden on the user, in that the user needs to understand numerous nodes and their behaviors, and must invoke them in the correct order, significantly increasing the complexity of the programming task, and therefore increasing the likelihood of errors.

In contrast, FIG. 9B illustrates an equivalent graphical program using a graphical API according to one embodiment of the present invention. As FIG. 9B shows, a single synchronization node may be used to interact with all of the devices in the system at once, i.e., in one invocation. Similar program simplification occurs with text-based embodiments of the API, as described above. Since the user has fewer functions and fewer rules regarding the use of the functions, the user may be able to work more quickly and effectively, and with fewer errors. Another benefit of the present API may be that the API increases the likelihood of backward and forward compatibility of user programs, in that the user is shielded from having to learn and manipulate individual device drivers, e.g., upon device replacement or upgrade. In other words, any changes to individual device drivers may be transparent to the user.

Figure 10:
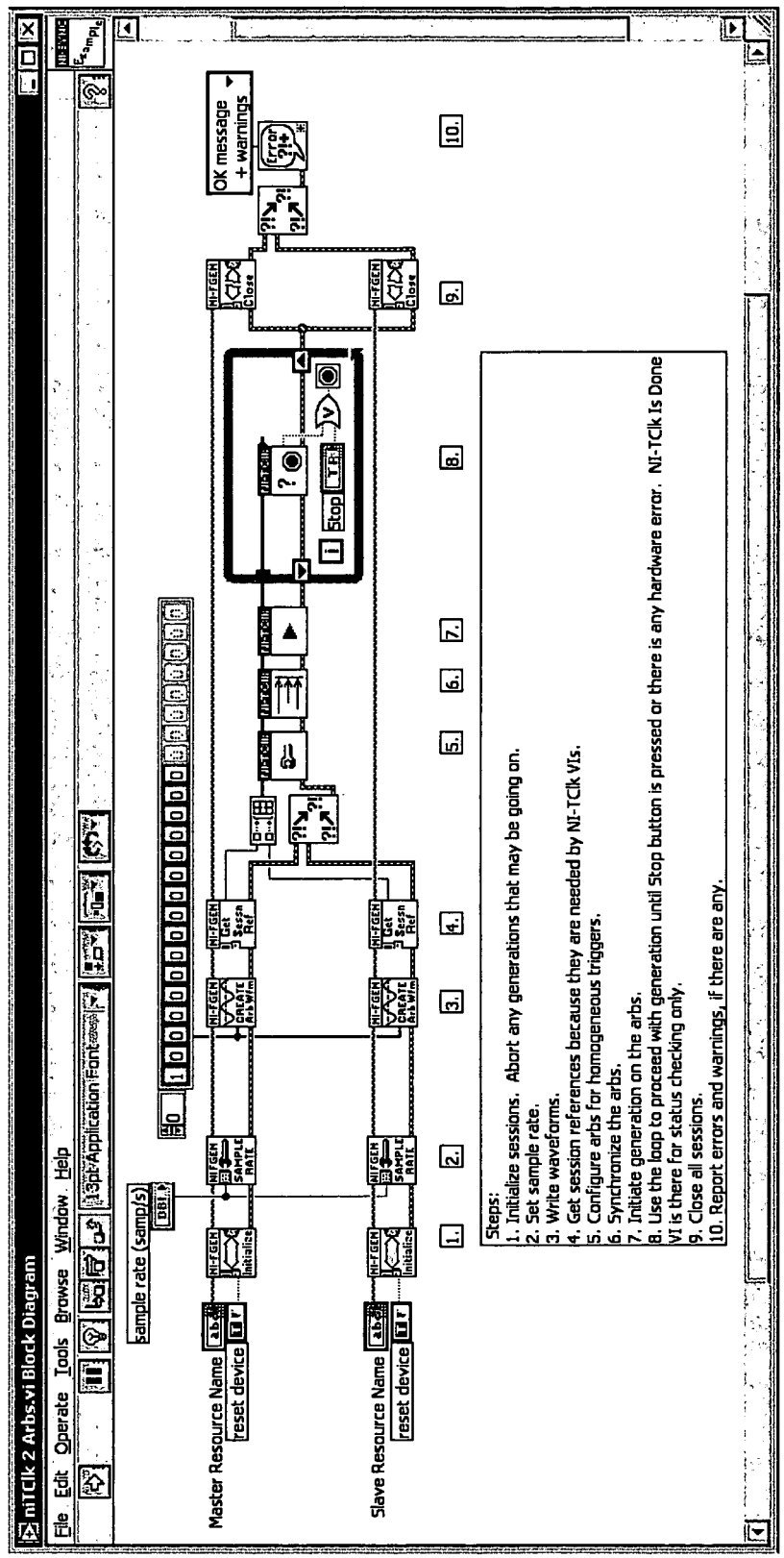
FIG. 10 illustrates a more complex graphical program for synchronizing two arbitrary waveform generators using one embodiment of the present API.

FIG. 10—An Example Graphical Program for Synchronizing Multiple Instruments Using the Present API FIG. 10 illustrates a graphical program for performing multi-device synchronization using the present API, according to one embodiment. More specifically, FIG. 10 illustrates an example LabVIEW program showing how a graphical version of the API may be used to synchronize two arbitrary waveform generators (arbs). As FIG. 10 shows, the graphical program implements a number of steps, here numbered 1 through 10, for preparing and synchronizing a plurality of devices or instruments. Note that the graphical program of FIG. 10 includes various nodes that are not specifically or properly part of the synchronization API, but that may be needed to perform various functions related to the preparation or operation of the devices. It should be further noted that although the example graphical program of FIG. 10 implements synchronization of two arbitrary waveform generators, this application is exemplary only, and is not intended to limit the application or use of the present API to any particular set or number of devices or instruments.

In one embodiment, the graphical program may first initialize sessions involved in the system (step 1), where each of the sessions is associated with a device or instrument, although it should be noted that in some cases, a single device may have more than one session. As FIG. 10 shows, this initialization may be performed by respective "Initialize" nodes, where each node operates to initialize a respective session.

The graphical program may then set a sample rate (step 2) for each session, here shown performed by respective "Sample Rate" nodes. The graphical program may also include respective nodes for writing waveforms, shown labeled "Create Arb Wfm" (step 3).

In one embodiment, nodes for retrieving respective session references, here labeled "Get Sessn Ref", may also be included in the graphical program (step 4), where, as shown, the get session reference nodes may operate to provide the retrieved session references for use by the synchronization nodes, each of which is denoted by the label "NI-TClk", and which correspond substantially to the API functions described above.

As FIG. 10 also shows, a configuration node (indicated with a "wrench" icon) may be included for configuring the two arbitrary waveform generators for homogeneous triggers (step 5), and a synchronize node included for actually synchronizing the two arbs (step 6).

As also shown, a start node (indicated with a "play" icon, i.e., a triangle) may be included for initiating generation with the arbs (step 7). In other words, when the start node executes, the two arbs may begin synchronous generation of the waveforms specified in step 3 above.

As FIG. 10 also indicates, a loop structure may also be included in the graphical program for continued generation of the waveforms by the arbs (step 8) until a stopping condition obtains, e.g., until a "stop" button is pressed or a hardware error occurs. As shown, in this example, the loop includes an "is done" node (indicated with a "?" and a stop symbol), which operates to monitor the status of the generation.

The graphical program of FIG. 10 also includes respective close nodes (labeled "Close" for closing the sessions (step 9), and, as shown, may also include an error node (labeled "Error") for reporting any errors or warnings that occur (step 10).

Thus, graphical program nodes substantially corresponding to the synchronization functions described above may comprise a graphical version of the present API, and may be used in a graphical program to perform multiple device synchronization with comparative ease and efficiency, as compared to prior art approaches.

FIGS. 11-18—Example Implementation of Functionality Underlying the API

FIGS. 11 through 18 illustrate an example implementation of the functionality underlying one embodiment of the present API. More specifically, FIGS. 11-17 illustrate embodiments of a hardware context for the functionality, and FIG. 18 flowcharts a method for synchronization of multiple instruments according to one exemplary implementation of the functionality of the present invention.

Figure 11:
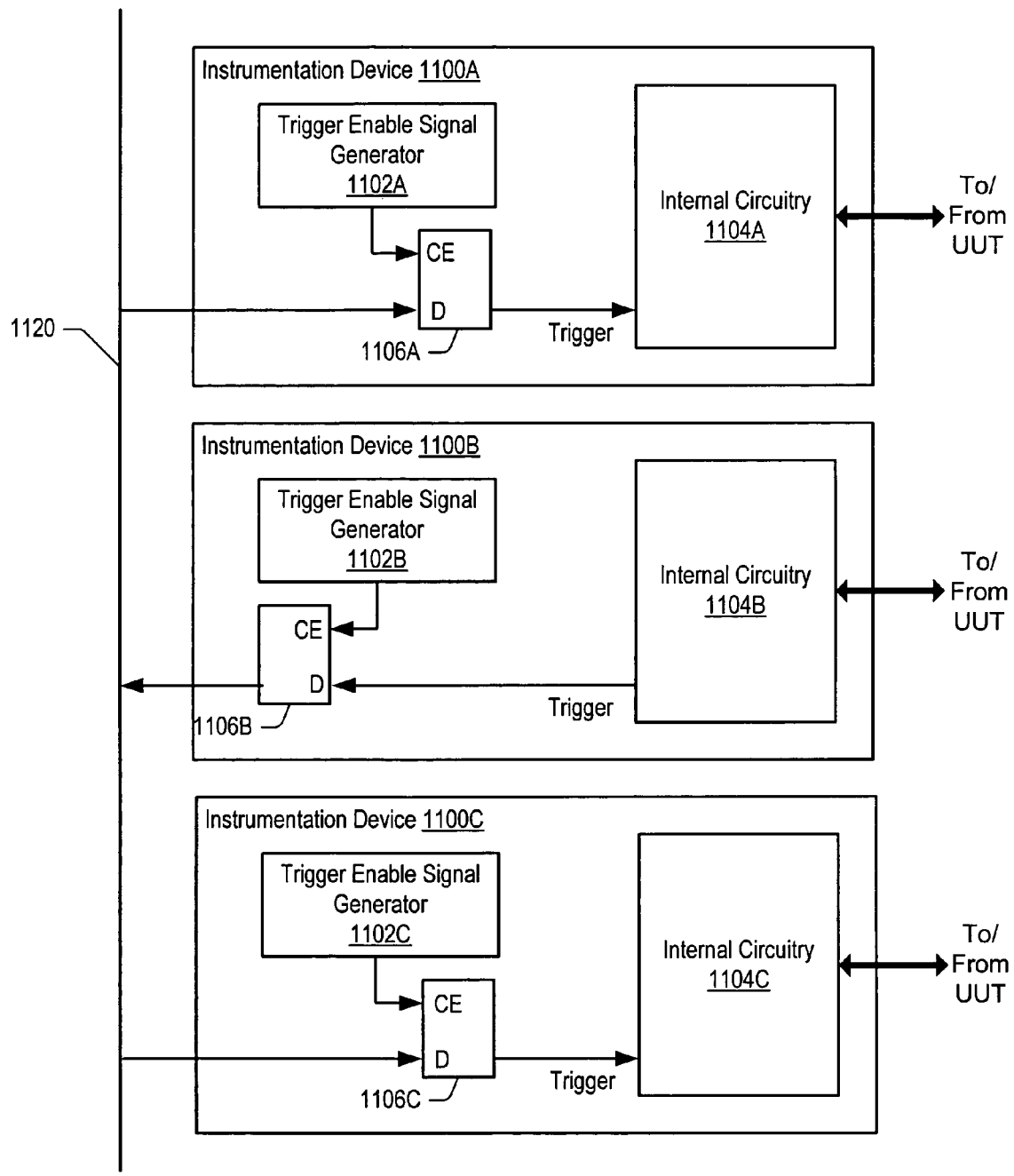
FIG. 11 shows a block diagram of one embodiment of an instrumentation system.

FIG. 11 shows a block diagram of one embodiment of an instrumentation system. Here, three instrumentation devices 100A, 100B, and 100C (collectively, instrumentation devices 1100) are coupled by a communication medium 1120. Each instrumentation device 1100 may be configured to send and/or receive trigger signals on the communication medium 1120. As shown, instrumentation device 100B may be configured to generate a trigger signal and to drive the trigger signal onto communication medium 1120. Instrumentation devices 1100A and 1100C may be configured to receive the trigger signal from the communication medium 1120. Each instrumentation device 1100 includes respective internal circuitry 1104A, 1104B, 1104C (collectively, internal circuitry 1104) that may generate and/or receive trigger signals transmitted on communication medium 1120. Each instrumentation device 1100 may also be configured to provide stimuli to and/or receive stimuli from a unit under test (as shown), process under test, and/or device being controlled and monitored.

As used herein, the term "communication medium" is intended to have its ordinary meaning as any of various types of media used to communicate data and/or control signals between devices. The term communication medium is intended to include media used for wireless communications (e.g., the atmosphere) as well as media used for wired communications (e.g., buses, point-to-point interconnects). Exemplary communication media may include buses such as IEEE 1394 buses, PCI (Peripheral Component Interconnect), PXI (PCI eXtensions for Instrumentation), SCXI (Signal Conditioning eXtensions for Instrumentation), CompactPCI, USB (Universal Serial Bus), PCI Express, etc. Other exemplary types of communication media include networks such as Ethernet, LANs (Local Area Networks), and WANs (Wide Area Networks). Note that the communication medium shown in FIG. 11 may represent various types of physical connections including metallic wire/cable(s), optical fiber(s), the atmosphere, etc., or any combination thereof.

As used herein, the term "device" is intended to have its ordinary meaning and to include any of various types of devices, units or components that generate and/or consume data in response to a clock signal. An "instrumentation device" is a device that performs an instrumentation and/or measurement function. The term "device" is intended to include "programmable devices" and "non-programmable devices." An instrumentation device may, in some embodiments, be implemented as an instrumentation board configured to be inserted into a computer system or instrumentation system. In other embodiments, an instrumentation device may be implemented in its own housing or chassis and configured to be coupled to a computer system or instrumentation system. Some instrumentation devices may be configured for use in instrumentation, control and monitoring, and/or industrial automation systems. Several exemplary instrumentation devices and communication media are shown in FIG. 3A, described above.

As used herein, the term "programmable device" is intended to include any of various types of devices that include one or more of: 1) a processor and memory; or 2) a programmable hardware element or reconfigurable logic. Exemplary types of processors include a conventional microprocessor or CPU (such as an X86, PowerPC, SunSparc, etc.), a digital signal processor (DSP), microcontroller, or other type of processor. Exemplary types of programmable hardware elements include a programmable logic device (PLD), e.g., an FPGA (field programmable gate array), or other types of reconfigurable logic. Exemplary types of programmable devices include computer systems; network devices; personal digital assistants (PDAs); television systems; measurement devices (including instruments, industrial automation devices, process control devices, smart data acquisition devices, smart sensors (including smart cameras), smart actuators, video devices (e.g., digital cameras, digital video cameras); audio devices; computer peripherals; telephones; appliances; or other processor-based or programmable hardware-based devices. Exemplary measurement and automation devices include any of the devices shown in FIGS. 3A and 3B. Exemplary network devices include network interface cards, routers, bridges, switches, hubs, etc.

The term "non-programmable device" is intended to include any of various components, such as transducers, sensors, connector blocks, cabling, and other non-programmable devices.

As used herein, a trigger is received by an instrumentation device 1100 when it is provided from an external communication medium 1120 to internal circuitry 1104 whose operation may be controlled by the trigger (as opposed to circuitry that merely transfers the trigger signal from one clock domain to another, such as D flip-flop 1106B). Thus, in FIG. 11, instrumentation device 1100B receives a trigger when the trigger is output from D flip-flop 1106B to internal circuitry 1104B. The internal circuitry 1104B may perform one or more operations in response to receiving a trigger. An instrumentation device 1100 drives a trigger when that trigger is output onto a communication medium 1120 that connects two or more instrumentation devices 1100.

Each device 1100 that is to be synchronized may be configured to generate one or more trigger enable signals that enable the driving and/or receiving of triggers by that device. Thus, each device 1100 may be configured to delay performance of an operation (e.g., by internal circuitry 1104) in response to a trigger signal conveyed over the communication medium 1120 until a transition in that device's trigger enable signal. For example, each device may buffer or otherwise delay a trigger signal (e.g., by inputting the trigger signal to a D flip-flop) until a transition in the trigger enable signal. For example, a trigger signal may be delayed by using the trigger enable signal as the clock for a D flip-flop in one embodiment. In the illustrated embodiment, trigger signals are delayed by using a trigger enable signal as a clock enable (CE) signal for a D flip-flop. Once the trigger is output to the internal circuitry 1104, the internal circuitry may perform one or more responsive operations. Thus, delaying the time at which the internal circuitry 1104 receives the trigger signal may delay the time at which one or more responsive operations are performed. Similarly, each device that drives triggers may delay driving a trigger onto the communication medium 1120 until a transition in that device's trigger enable signal.

In the embodiment of FIG. 11, instrumentation device 1100A includes a trigger enable signal generator 1102A, a D flip-flop 1106A, and internal circuitry 1104A. The D flip-flop 1106A's input is coupled to receive a trigger signal transmitted over the communication medium 1120. In response a transition in an enable signal generated by the enable signal generator 1102A, flip-flop 1106A outputs the trigger signal to internal circuitry 1104A, allowing the internal circuitry to receive the trigger signal. Similarly, instrumentation devices 1100B and 1100C respectively include trigger enable signal generators 1102B and 1102C. The trigger enable signal for each device enables (or, in alternative embodiments, clocks) a D flip-flop (1106B and 1106C, respectively), allowing a trigger generated by respective internal circuitry 1104B and 1104C to be driven onto communication medium 1120. The trigger enable signal (or signals) generated by each device controls the generation and/or receipt of external triggers by each device. The trigger enable signals may be used to synchronize devices in an instrumentation system. For example, in some embodiments, trigger enable signals may allow multiple devices to be digitally synchronized. In other embodiments, trigger enable signals may allow multiple devices to operate in lockstep.

Figure 12:
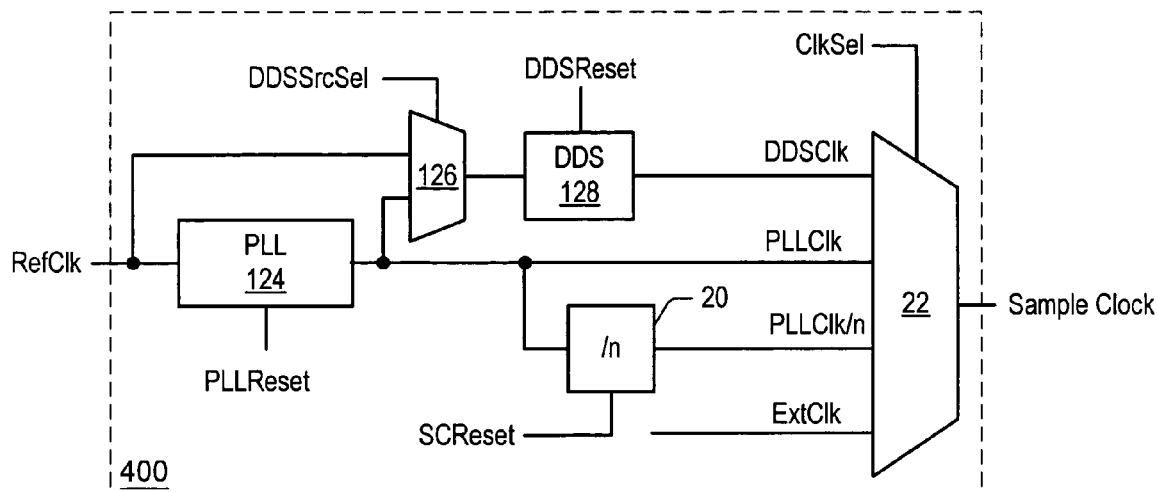
FIG. 12 is a block diagram of a sample clock generation circuit that may be included in some embodiments of an instrumentation device.

Each instrumentation device 1100 that is to be synchronized may include a clock generation circuit 400, such as the one shown in FIG. 12. Clock generation circuit 400 is configured to generate a sample clock. In many embodiments, each device's clock generation circuit 400 may generate a sample clock that has the same frequency as each other device's sample clock signal. The clock generation circuits may be configured so that each device's sample clock is in phase with the sample clocks of the other devices 1100 in some embodiments.

FIG. 12 shows one embodiment of a clock generation circuit 400. In this embodiment, clock generation circuit 400 includes a PLL (Phase Locked Loop) 124 generates a PLL clock signal, e.g., PLLClk, from a reference clock signal, e.g., RefClk. In alternative embodiments, a DLL (Delay Locked Loop) may be used instead of or in additional to PLL 124. In one embodiment, the reference signal may be a 10 MHz reference clock. In PXI embodiments, the reference signal may come from the PXI backplane. In some PCI embodiments, the reference signal may be a RTSI_OSC signal. If a PLL is used, the output PLLClk of the PLL may have any frequency for which the PLL can lock on to the reference clock signal RefClk.

In some embodiments, the sample clock signal may not be an integer multiple of the reference clock signal. In one such embodiment, the PLL or DLL used to generate the sample clock may be configured such that it will respond consistently to a reset signal, e.g., PLLReset, which is received synchronously with the reference clock signal. In other such embodiments, each instrumentation device may include calibration circuitry to measure and adjust the phase of that device's sample clock signal.

In the embodiment shown, a DDS (Direct Digital Synthesis) unit 128 receives an input selected by a DDSSrcSel input to a multiplexer 126. In this embodiment, the multiplexer 126 selects between the RefClk signal and the output of the PLL 124. The DDS 128 operates on the input signal provided by multiplexer 126 to generate a DDSClk signal.

A frequency divider circuit 20 may divide the PLLClk signal by n to generate a PLLClk/n signal.

A ClkSel input to a multiplexer 22 may select which signal to output from the sample clock generation circuit 400 as the sample clock signal. For example, depending on the current value of ClkSel, the sample clock may equal an external clock signal ExtClk, the output PLLClk of the PLL 124, the output PLLClk/n of the frequency divider 20, or the output DDSClk of the DDS 128. Other embodiments of a sample clock generation circuit 400 may select between fewer or additional numbers of signals (e.g., using multiplexer 22) when selecting which signal to output. The sample clock signals used in a set of instrumentation devices may determine the degree of synchronization that can be achieved for that set of devices in some embodiments.

Figure 13:
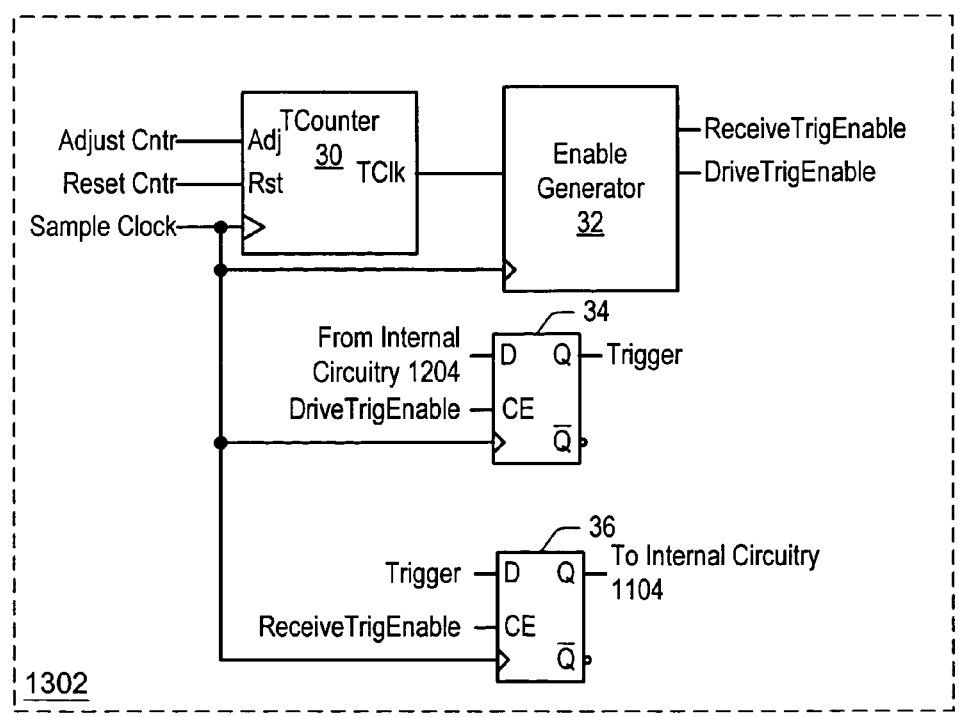
FIG. 13 is a block diagram of one embodiment of a trigger enable signal generator circuit.

FIG. 13 shows one embodiment of a trigger enable signal generator 1102 that may be used to control the receipt and/or generation of trigger signals by an instrumentation device 1100. In one embodiment, a trigger enable signal generator 1102 may be implemented in an FPGA (Field Programmable Gate Array). Each instrumentation device 1100 that is to be synchronized may include a trigger enable signal generator 1102 similar to the one shown in FIG. 13. In this embodiment, the trigger enable signal generator 1102 includes a counter 30, an enable generator 32, and two D flip-flops 34 and 36. As shown, the inputs to the trigger enable signal generator 1102 may include a sample clock signal generated by a clock generation circuit 400 like the one shown in FIG. 12.

In the embodiment of FIG. 13, two trigger enable signals are derived from an intermediate signal (referred to as TClk in this disclosure). Each device may generate TClk by dividing the sample clock signal. For example, in a PXI system, each device may divide its sample clock signal down to a frequency that is low enough to allow triggers to be reliably sent and received over the PXI backplane. Similarly, in a PCI system, devices may divide their sample clocks down to a frequency at which triggers may reliably be sent over the RTSI bus. These embodiments may provide synchronicity among devices independent of the relationship of sample clock to a reference clock signal. In some embodiments, devices may also include circuitry that compensates for differing pipeline delays in the data paths of different devices, allowing their data to line up at their front panels.

The counter 30 used in this embodiment is clocked by the sample clock signal (e.g., generated by a clock generation circuit like the one shown in FIG. 12). The counter 30 may be configured to generate a trigger clock signal, TClk, with a frequency equal to 1/N of the sample clock frequency. The counter may be configured to increment each time the sample clock signal transitions from low to high. Upon incrementing a specified number of times (e.g., a midpoint value), the counter 30 may assert the TClk output. After the TClk output is asserted, the counter may continue incrementing until it reaches a full or rollover value. Having reached the full or rollover value, the counter may return to an initial value (typically zero) upon the next sample clock edge. The Clk signal may be deasserted in response to either reaching the full or rollover value or upon resetting to the initial value. Note that more than one counter value (or more than one counter) may be used (e.g., one counter or counter value may control when TClk is asserted and another counter or counter value may control when TClk is deasserted). Each counter value may be programmed independently (or each counter may be programmed with a difference rollover value), allowing the duty cycle of TClk to have values other than 50%. The duty cycle of TClk may be programmably adjusted by programming different values for one or both of the counter values (or for one or more of the counters' rollover values). In some embodiments, the different values of counter 30 may be programmed so that TClk's frequency is close to the frequency of the reference signal, or a divided sample clock, whichever is less. However, other embodiments may not select such rollover values, i.e., different rollover values may be selected, or the user may not be allowed to select or program the rollover values at all.

In one embodiment, counter 30 may include a reset input and an adjustment input. The reset input may be used to reset the counter to an initial value (e.g., 0) and the adjustment input may be used to adjust the current, midpoint, and/or the rollover value of the counter (e.g., to adjust the phase and/or frequency of the signal output by the counter). The counter 30 may toggle the TClk signal at the midpoint value and at the rollover (or initial) value.

The TClk signal itself may be used as a trigger enable signal for receiving and/or sending triggers in some embodiments. In other embodiments, the signal generated by the counter 30 may be output to the enable generator 32. The enable generator 32 may be configured to generate two enable signals, ReceiveTriggerEnable and DriveTriggerEnable, from TClk. Note that in alternative embodiments, counter(s) 30 may be used to generate ReceiveTriggerEnable and DriveTriggerEnable directly from sample clock (instead of generating an intermediate TClk signal).

Circuitry 1104 that drives triggers may do so using a flip-flop clocked by sample clock and enabled by DriveTriggerEnable, a signal that asserts for one sample clock period in response to a falling edge on TClk (or in response to a certain number of rising or falling edges in the sample clock signal). Similarly, circuitry 1104 that receives triggers may do so using a flip-flop clocked by sample clock and enabled by ReceiveTriggerEnable, a signal that asserts for one sample clock period in response to a rising edge on TClk (or in response to a certain number of rising or falling edges in the sample clock signal).

Figure 14:
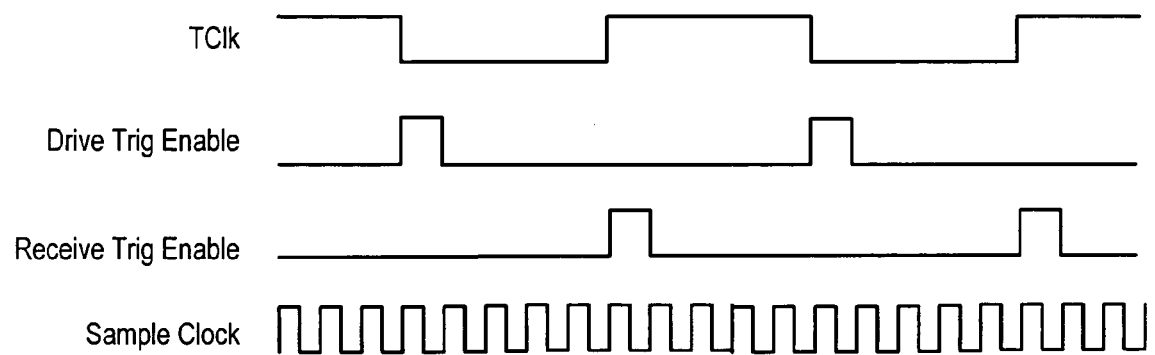
FIG. 14 is a timing diagram illustrating how trigger enable signals may be generated from a TClk signal, according to one embodiment.

FIG. 14 illustrates how DriveTriggerEnable and ReceiveTriggerEnable may be generated relative to TClk and the sample clock, according to one embodiment. In FIG. 14, DriveTriggerEnable is generated for one sample clock period in response to each falling TClk edge. ReceiveTriggerEnable is generated for one sample clock period in response to each rising TClk edge. As mentioned above, note that in some embodiments, DriveTriggerEnable and ReceiveTriggerEnable may be generated directly from the sample clock (e.g., using one or more counters) instead of being generated from an intermediate TClk signal.

Each device's counter 30 may be initially configured with the same full or rollover value. If each device's sample clock is in phase with each other device's sample clock, the counters 30 on each device may generate TClk signals that are in phase.

When the devices 1100 to be synchronized begin operating, a reset signal may be provided to the counter 30 included on each device in order to reset each of the trigger enable signal generators 1102. However, at certain sample clock frequencies (e.g., above 50 MHz), it may be difficult to provide a reset signal that will be received in the same sample clock cycle by all of the devices. As a result, in some embodiments, the trigger enable signal generators 1102 may be reset asynchronously. In embodiments that include counter 30, this may cause the TClk signals generated on each device to be out of phase with each other. However, the differences between the counters 30 on each device may be calibrated out after the counters have been reset. Once the differences between the counters have been calibrated out, the TClk signals on the devices are substantially in phase.

TClk Calibration

In order to align the counters 30 one each device, the TClk signals on various devices may be compared to each other. Differences between TClk signals generated on different devices may be removed by calibration, as noted above.

Different embodiments may measure and calibrate the TClk signals generated on each of the devices in different ways. In some embodiments, each device 1100 may drive its internal TClk signal onto a connector that is accessible by an operator. For example, each device may drive its TClk signal onto a coaxial connector included on its front panel. An operator may connect each device's output to a device that can measure the phase difference between any two or more of the devices. This measurement device may be an external oscilloscope, a PXI digitizer (e.g., located in the same chassis as the devices 1100 whose TClk signals are being measured), or any other device or combination of devices that can perform such a measurement. Once the phase differences between the various TClk signals have been measured, the phase of each TClk signal may be adjusted (e.g., by providing appropriate adjustment inputs to one or more of the counters 30 included on one or more of the devices). Note that in alternative embodiments, each device may drive an output waveform onto a connector in response to that device's TClk signal. The differences in several devices' output waveforms (e.g., the differences in the phase of a periodic output by each of the devices) may be indicative of both the TClk misalignment and sample clock misalignment between those devices.

In some embodiments, this process may be automated. In other embodiments, measuring and adjusting the phase of each TClk signal may involve the performance of one or more manual procedures.

Figure 15:
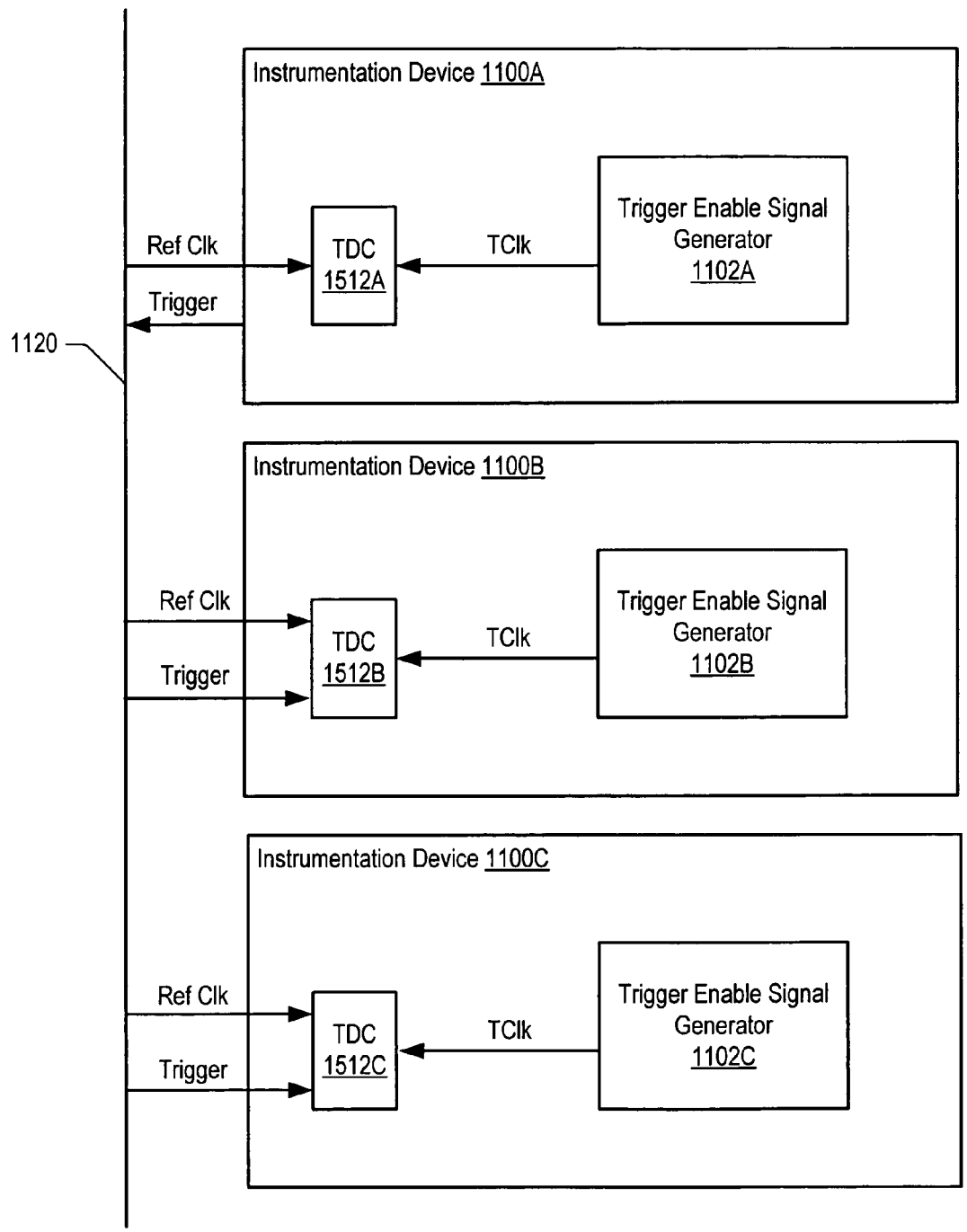
FIG. 15 is a block diagram of another embodiment of an instrumentation system.

In other embodiments, each of the devices to be synchronized may include measurement hardware. FIG. 15 shows one embodiment of an instrumentation system in which each device includes a TDC (Time-to-Digital Converter) 1512A, 1512B, and 1512C, respectively, that is configured to measure the time between a rising edge of TClk and an edge of the reference clock signal. The edge of the reference clock to use may be indicated by the assertion of a particular trigger signal. In one embodiment, one of the devices (e.g., 1100A) being synchronized may be designated as a master device and configured to assert this trigger signal. All devices monitoring this trigger signal may measure the time delay in response to the assertion of this trigger signal. Software (e.g., running on a host computer system 82 as shown in FIGS. 3A-4B and FIG. 5B) may be configured to cause the master device to assert the trigger. Software may also read the delay value measured on each of the devices in response to the trigger. The software may then make the TClk adjustments (e.g., by adjusting a counter value) on each device according to the measurements that are read.

Note that, for the purposes of calibration, the relationship of the reference clock to TClk or to the sample clock may not be relevant. The assertion of the trigger synchronous to the reference clock that initiates the delay measurement may provide a common reference point in time that each of the devices uses to make a measurement.

Figure 16:
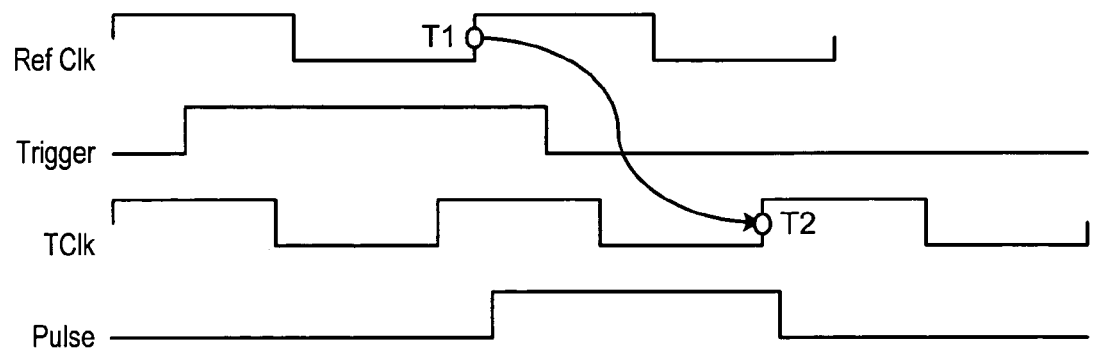
FIGS. 16 and 16A are timing diagrams illustrating how a measurement may be made in order to calibrate TClk signals in different instrumentation devices, according to some embodiments.

FIG. 16 is a timing diagram illustrating how a TDC 1512 may make a calibration measurement in one embodiment. The trigger signal determines the reference clock edge where the measurement starts. Accordingly, when a trigger signal is detected, the TDC 1512 may begin measuring at the next edge of the reference clock. In the illustrated embodiment, the measurement begins at the next rising edge, indicated as T1. The TDC 1512 may begin the measurement by asserting a pulse signal. The TDC 1512 ceases measuring at the next rising edge of TClk, indicated as T2, causing the pulse signal to be de-asserted. The TDC 1512 measures the assertion time of the pulse signal. Software may read the assertion time from the TDC 1512 on each device that is to be synchronized. The difference in the assertion time values read from two devices indicates the difference in phase between those devices' TClks. Accordingly, the differences between different devices' measured assertion times may be used to calibrate the counters on each device.

Figure 16A:
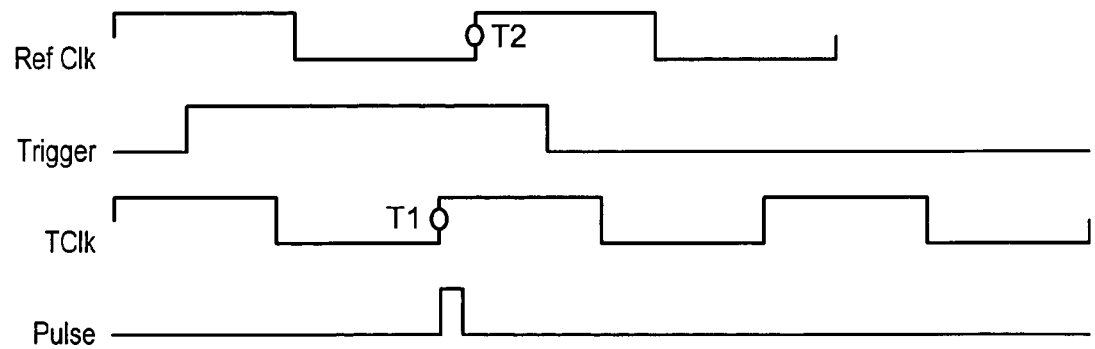

In some embodiments, the width of the pulse generated by the TDC 1512 may depend on the frequency of TClk. If the frequency of TClk is not limited to a narrow range, it may be difficult to implement a TDC 1512 that can accurately generate and/or measure the broad range of potential pulse widths. However, if the TDC 1512 is configured to generate the pulse signal starting with a TClk edge and ending with a reference signal edge, the possible widths of the pulse may have a more manageable range that is independent of the frequency of TClk. Accordingly, in some embodiments, the measurement process shown in FIG. 16 may be modified as shown in FIG. 16A so that the pulse is asserted beginning with the next rising edge of TClk after the assertion of the measurement trigger and ending with the next rising edge of the reference signal.

A third calibration technique may be used in some embodiments where the sample clocks of each device 1100 are integer multiples of a reference clock. In these embodiments, the TClk frequency may be set to equal the reference clock frequency. Digital circuitry that is configured to automatically lock the phase of TClk to that of the reference clock may be included on each device 1100. This digital circuitry locks each device's TClk to the reference clock, allowing the TClks on each device 1100 to be in phase with each other. It also allows devices 1100 that use TClk to communicate with devices that use the reference clock as their trigger reference clock.

A fourth calibration technique may be used in some embodiments. In these embodiments, each device 1100 within a chassis may be configured to drive its internal TClk onto a connector (e.g., a coaxial connector on its front panel). Each device 1100 may also receive a TClk signal from another device 1100 through another connector (e.g., the devices may be connected in a daisy-chain fashion). Each device 1100 may measure the phase difference, if any, between its own TClk signal and the TClk signal of the other device 1100, taking into account any relevant cable delays, and adjust the phase of its own TClk signal to match the phase of the incoming TClk signal.

If the cable delays between devices are known (or detectable by each device), the TClk interconnections may be extended to PCI devices and/or multiple chassis using the same technique used within a single chassis.

Figure 17:
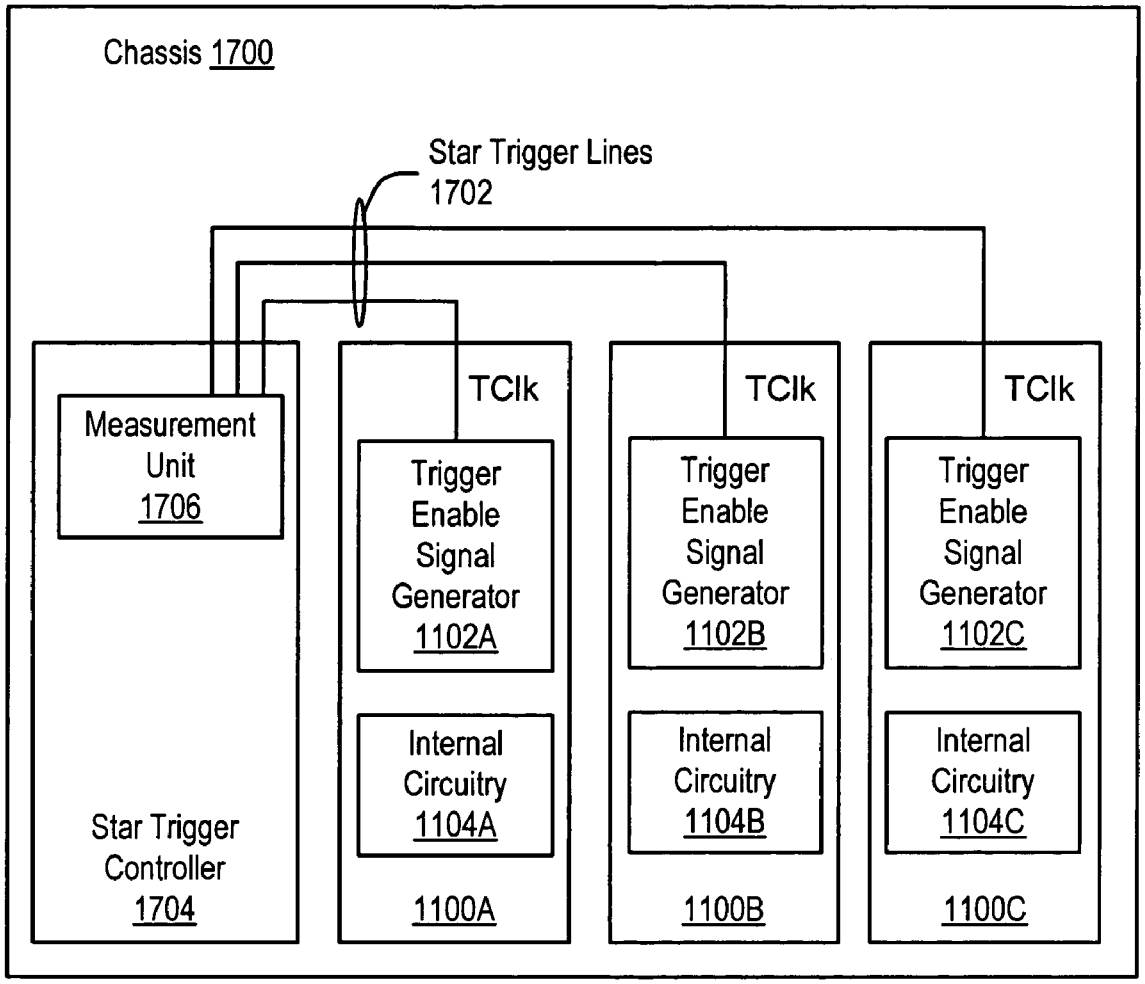
FIG. 17 is a block diagram of an instrumentation system chassis, according to one embodiment.

Yet another calibration technique may be used in embodiments such as the one shown in FIG. 17. FIG. 17 illustrates an instrumentation chassis 1700 that includes a star trigger controller 1704 and star trigger lines 1702 with matched propagation delays that couple the star trigger controller 1704 to the other instrumentation devices 1100. Each star trigger line 1704 is a point-to-point line that can be used to convey star triggers between the star trigger controller 1704 and a device 1100. In such embodiments, each device 1100 may drive its TClk signal onto its star trigger line 1702. The star trigger controller 1704 may include a measurement unit 1706 that measures the time difference between edges (e.g., rising edges) on two or more of its star trigger inputs. Because sample clock signals are assumed to be in phase on all devices, the difference between any two inputs at the star trigger controller 1704 will be in integer multiples of the period of the sample clocks. If a difference is detected, software may be used to adjust each device's counter as needed.

Each star trigger controller 1704 may also synchronize the TClk signals received on star trigger lines 1702 with a signal received via a coaxial input, allowing components within multiple chassis to be synchronized. Similarly, the star trigger controller 1704 and send its TClk signal out a coaxial output for use by another chassis. The chassis may be daisy-chained together and each star trigger controller may measure the time difference between an edge in a coaxial input signal (received from a star trigger controller in another chassis) and an edge in a local TClk reference signal. This measurement may take into account the propagation delay from the other chassis to the star trigger controller. Other non-coaxial connectors may be used to link multiple chassis in other embodiments.

Note that similar compensation techniques may be applied in embodiments using other types of trigger lines instead of and/or in addition to star trigger lines, such as bussed trigger lines, front panel trigger lines, and local bus trigger lines.

Delay Path Compensation

The use of synchronization techniques that include local trigger enable signals may provide a means by which two or more instrumentation devices with synchronized sample clocks may have their internal state machines see trigger assertions on the same sample clock edge. If dissimilarities exist in the data path between output units included in the instrumentation devices being synchronized, such as when two analog output devices include DACs that have different delays, additional synchronization techniques may be implemented.

For example, in some embodiments, output units may provide a programmable delay of a certain number of sample clocks in their data path so that instrumentation devices that include output units with both short and long data paths can be synchronized. The maximum programmable delay of an output unit (e.g., a DAC) may be selected based on the amount of circuitry used to implement that delay. For example, in one embodiment, a maximum delay of 64 clocks may be implemented. While other embodiments may support more than 64 clocks (depending on interpolation levels, for example), it may not be as practical to provide for more delay because of the amount of circuitry required.

The same type of delay path compensation may be applied to input units, as well. Thus, in some embodiments, input units may provide a programmable delay of a certain number of sample clocks in their data path so that instrumentation devices that include input units with both short and long data paths can be synchronized, e.g., with the maximum programmable delay based on the amount of circuitry used to implement that delay.

Synchronization Method

Figure 18:
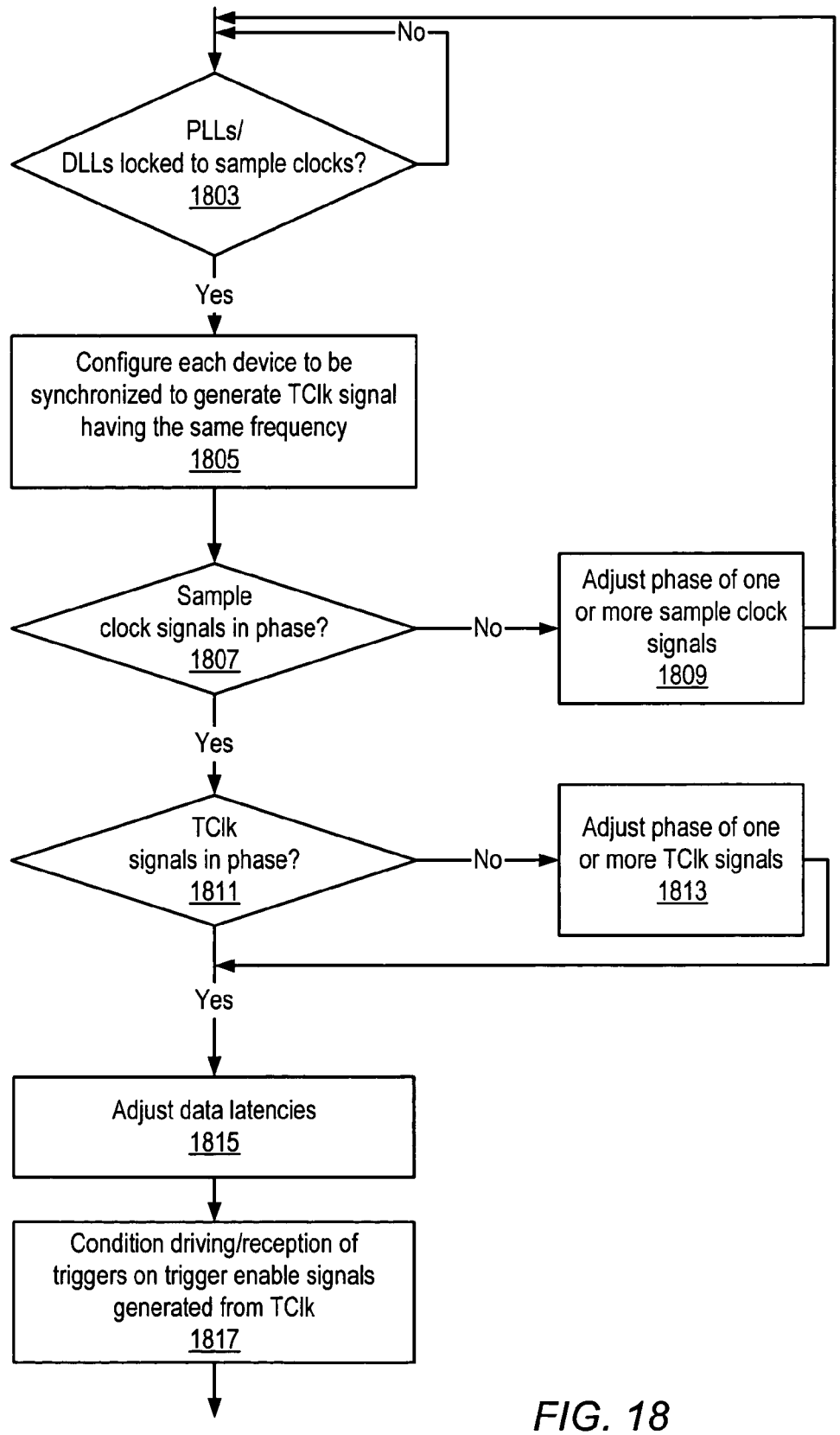
FIG. 18 is a flowchart illustrating one embodiment of a method of synchronizing instrumentation devices.

FIG. 18 shows one embodiment of a method of synchronizing several instrumentation devices using embodiments of the above API. In some embodiments, several of the method's functional blocks may be performed in software.

In one embodiment, software may designate one of the instrumentation devices to be synchronized as the master device and instruct the master device to drive a signal that will be used to synchronize the other devices. For example, the master device may drive a PXI trigger line with a signal that is synchronous to a 10 MHz reference clock. The devices to be synchronized (including the master) may receive the signal on the PXI trigger line and route the signal to the appropriate reset input (e.g., a reset input of a counter 30) of the appropriate synchronization circuitry.

In some embodiments, any PLL and DLL circuits that lock to the sample clock signal may be locked before proceeding, as shown at 1803. In one embodiment, each device may provide register bits indicating the locked/ unlocked status of its PLLs and DLLs. The technique for determining PLL or DLL locked status may be device specific in some embodiments.

At 1805, the devices may be configured for the desired frequency of TClk (e.g., by setting counter full or rollover values and/or selecting a signal from which TClk will be generated). Each group of devices to be synchronized may be configured with a common TClk frequency. In one embodiment, the TClk frequency may be selected to be the greatest common factor of the devices' sample clock frequencies. In other embodiments, the TClk frequency may be selected to be less than or equal to some specified maximum frequency or rate, e.g., 5 or 10 MHz. Note that the maximum frequency determines the shortest amount of time available to transmit a signal from one device to another, e.g., signals sent on a falling edge of TClk and received on the next rising edge at 10 MHz may have (in a worst case) approximately 50 ns to travel from one device to another. Thus, a 10 MHz clock signal may have a period of 100 ns, where the time from falling edge to rising edge is ½ of that period in the worst case (e.g., with a 50% duty cycle). Similarly, 5 MHz may correspond to a 100 ns worst case travel time for the signal. Thus, there may be an upper limit on how fast TClk may be run, and the user may be able to slow it down even more if the signals are to be sent a long way. Thus, for example, if two devices that have respective sample clocks of 45 M Hz and 60 MHz are to be synchronized, their TClk frequencies may be 5 M Hz, even though 15 MHz is also a common factor.

If the sample clock signals are not in phase, the sample clocks may be aligned to each other, as indicated at 1807-1809. A determination may be made as to whether the sample clocks signals are in phase by measuring a phase difference in TClk signals generated by each of the devices to be synchronized. In one embodiment, this phase difference may be measured by providing a trigger to each of the devices to be synchronized. In response to the trigger, each device may generate a pulse whose duration is indicative of a delay between an edge of a reference signal and an edge of the TClk signal. This pulse may be input to a TDC circuit configured to output a value indicative of the duration of the pulse. The measured pulse duration may represent an integer number of sample clocks periods and/or a fractional portion of a sample clock period. In one embodiment, the integer number represents the amount that one of the device's TClk signals should be adjusted while the fractional portion indicates the amount the phase of one of the device's sample clock signals needs to be adjusted. For example, if the sample clock period is 10 ns and a TClk misalignment of 102 ns is measured, the 10 sample clock period (100 ns) difference may indicate the TClk adjustment and the 2 ns difference (⅕ of a sample clock period) may indicate the amount of phase adjustment to use for one of the device's sample clock signals. If one or more of the devices' sample clock signals are adjusted at 1809, the alignment procedure may wait for any PLLs and/or DLLs to lock to the sample clock signals on each device before proceeding, as shown at 1803.

If the TClk signals generated by the devices are not in phase, the TClk signals may be aligned to each other, as shown at 1811 and 1813. In one embodiment, the TClk signals may be aligned by providing a trigger to each of the devices. In response to the trigger, each device may generate a pulse whose duration is indicative of a delay between an edge of a reference signal and an edge of the TClk signal, as done above to adjust for sample clock differences. This pulse may be input to a TDC circuit configured to output a value indicative of the duration of the pulse. The trigger may be asserted by one of the devices that is to be synchronized. The trigger may also be asserted synchronously to the reference clock. Based on the value generated by each device's TDC, the phase of each device's TClk signal may be adjusted (e.g., as described above with respect to the sample clock alignment). This process may be repeated until the TClks are in phase with each other (not shown).

Once the TClks are aligned, one or more of functional blocks 1803-1813 may be repeated if the sample clock used by the devices is provided from a PLLClk/n divider or a DDS chip.

In some embodiments, some devices may have different data latencies than other devices. As shown at 1815, the data latencies of certain devices may be adjusted so that the devices' outputs line up. In one embodiment, each device may have a programmable data latency. The data latencies of devices with shorter data pipelines may be increased until their output lines up with that of the devices that have longer data pipelines.

At 1817, the TClk signal (or one or more trigger enable signals derived from TClk) generated by each device may be used to send and receive triggers. By sending and receiving triggers dependent on edges of the TClk signal, each of the devices may send and receive triggers deterministically. In one embodiment, triggers may be driven in response to a falling edge of TClk and received in response to a rising edge. If desired, additional synchronization functions may also be performed using the TClk signal. For example, a set of digitizer devices may each include a decimation counter that should be in phase on each device. A TClk-synchronous trigger may be used to reset the decimation counter in the same sample clock cycle on every device.

Note that in some embodiments, the sample clock signals used by each of the devices to be synchronized may be aligned using a different technique than described above. In some embodiments, each device may include means to adjust the phase of sample clock (e.g., according to a measurement made at the front panel). In other embodiments, sample clock alignment may be achieved in various ways that are dependent on the source of the sample clock. For example, if each device's sample clock signal is generated to have a frequency that is an integer multiple of a 10 MHz reference signal using a PLL, the sample clock signals on each device may be in phase, regardless of whether the devices' PLLs are reset in the same reference signal cycle. If the sample clock frequency is not an integer multiple of the reference signal's frequency, the devices' PLLs may be reset in the same reference signal cycle, synchronous to the reference signal.

Alternatively, if each device's sample clock signal is provided from an external source, the user may ensure that the devices each receive sample clock signals that are aligned with each other. If the devices' sample clock signals are generated by DDS circuitry on each device, the DDS circuitry may be reset synchronously to its reference clock input. For example, if the reference clock is a 10 MHz reference clock, then guaranteeing phase alignment of sample clocks may involve routing a trigger synchronous to 10 MHz reference clock to the reset input of the DDS circuitry. Alternatively, instead of resetting the DDS devices, parameters for one or more of the devices' DDS circuitry may be calibrated based on differences in the sample clock signals measured for two or more of the devices.

Note that in some embodiments, if the reference clock is not the 10 MHz reference clock or if the sample clock is generated by a frequency divider from a PLL output (e.g., the sample clock equals PLLClk/n), the sample clock may initially be generated as the undivided output PLLClk of the PLL. Once the PLLClk and TClk signals on each device are aligned, software may then set the desired value of n and send a TClk synchronous trigger to each device. Each device may use that trigger to reset its frequency divider in the same cycle of PLLClk. Software may then reconfigure the device to use PLLClk/n as the sample clock. The instrumentation system may then align the PLLClk/n signals to each other. Additionally, the TClk signals may be realigned.

Types of Synchronization

Various embodiments of instrumentation systems in which instrumentation devices use an internally generated TClk signal to receive and send triggers may implement different types of synchronization. For example, in some embodiments, a system may be synchronized such that it is a homogeneous system. As described herein, a homogeneous system is a system in which there are no cycle-to-cycle differences between synchronized devices in the system. Thus, sample clocks are all synchronized to each other and all devices' internal circuitry responds to trigger inputs in exactly the same sample clock cycle.

In other embodiments, multiple instrumentation devices may be configured to provide digital stimulus in concert. For example, if each instrumentation device has a 32-bit connector, grouping four of them together may create a 128-bit digital generation engine. In systems like this, it may be desirable to digitally synchronize the devices that are providing stimulus in concert. In some embodiments, additional pin-to-pin deskewing may be performed for one or more of the instrumentation devices being synchronized in order to implement substantially the same the delay in the devices' input and/or output paths.

Heterogeneous systems with common sample clock circuits may also be implemented using embodiments such as those described above. Although the devices in such a system may not be the same (e.g., they may include a combination of digital and analog waveform generators), if each device contains the same sample clock generation circuit and is programmed to create the same sample clock frequency, then the degree of synchronization achieved in this system may be the same as that achieved in a homogeneous system, subject to the different delays inherent in different designs, such as the delay through a DAC. In some embodiments, one or more delays (e.g., in an input and/or an output path included in a particular device) may be adjusted in order to achieve digital synchronization.

Synchronization in a heterogeneous system means that the assertion of a trigger causes the different devices in the system to consistently respond so such that the difference between the response times of various devices is within a minimum amount of time, preferably one clock period. If there are different sample clock frequencies involved, a consistent system-wide trigger response is possible if a common TClk frequency can be found. If no common TClk frequency can be found for the entire system, then it may not be possible to achieve a consistent system-wide trigger response. It is still possible, however, to logically group devices together that can have a common TClk frequency. Each device within a group may respond consistently to a trigger; however, as a whole, each group may not necessarily respond consistently.

Note that other types of synchronization may be implemented between devices in other embodiments. For example, in some embodiments, devices may be synchronized such that each device responds to a given trigger signal with a given period (e.g., a window of two or more sample clock cycles).

Note that in a preferred embodiment, the synchronize function (e.g., niTClk_Synchronize) implements all the method steps of FIG. 18 except 1817 (step 1817 is implemented by individual instrument drivers). One particularly important function of the present API is determining the period of the TClk signal, which is part of step 1805. In a preferred embodiment, the period of TClk is determined by querying each of the synchronized sessions for a number of relevant attributes, such as, but not limited to, sample and reference clock rates. Additionally, the minimum T Clock period specified by the user via minTClkPeriod parameter of the niTClk_Synchronize function may also be taken into account. Given this information, the shortest possible T Clock period that satisfies the constraints of all sessions and those specified via minTClkPeriod is determined. If it is possible to program the hardware with this period, this is done, otherwise, an error message may be returned to the user.

Thus, various embodiments of the API described herein may simplify synchronization of multiple devices or instruments in a system, and may be implemented for text-based programming or graphical programming.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A memory medium that stores program instructions implementing an application programming interface (API) for synchronizing multiple devices in a system, wherein the API comprises:

a plurality of functions invocable in a program to synchronize a plurality of devices, wherein each function is executable to perform a respective functionality related to synchronizing the plurality of devices, and wherein at least one of the plurality of functions is executable to access a plurality of instrument drivers corresponding respectively to the plurality of devices to synchronize the plurality of devices;

wherein, in synchronizing the plurality of devices, the at least one of the plurality of functions is executable to:

query each of the plurality of devices to determine a trigger clock signal for each of the plurality of devices based on one or more of:

a common sample clock;

a common reference clock; or a specified minimum trigger clock period; and synchronize the plurality of devices based on the determined trigger clock signals, wherein, in synchronizing the plurality of devices based on the determined trigger clock signals, the at least one of the plurality of functions is executable to:

equalize phase of the common sample clock and/or the common reference clock of each of the plurality of devices;

equalize phase of the trigger clock signals of each of the plurality of devices; and condition driving and/or reception of triggers on trigger enable signals generated from the trigger clock of each of the plurality of devices.

2. The memory medium of claim 1, wherein the API further comprises:

a plurality of attributes, wherein each attribute corresponds to a respective property of the system related to synchronization of the plurality of devices, and wherein each attribute is configurable to specify the respective property.

3. The memory medium of claim 2, wherein the plurality of attributes comprises a set of attributes for each respective device of the plurality of devices.

4. The memory medium of claim 3, wherein the set of attributes for each respective device of the plurality of devices comprises one or more of:
   one or more trigger attributes; or
   one or more trigger clock attributes.

5. The memory medium of claim 4, wherein the one or more trigger attributes comprises one or more of:
   a start trigger master session attribute, specifying which of the plurality of devices provides a start trigger;
   a reference trigger master session attribute, specifying which of the plurality of devices provides a reference trigger;
   a script trigger master session attribute, specifying which of the plurality of devices provides a script trigger;
   a pause trigger master session attribute, specifying which of the plurality of devices provides a pause trigger; or
   a reference trigger from non-reference trigger attribute, indicating that the reference trigger for the respective device is from a non-reference trigger from another respective device.

6. The memory medium of claim 4, wherein the one or more trigger clock attributes comprises one or more of:
   a trigger clock synchronization pulse source attribute, specifying a source of a synchronization pulse;
   a trigger clock synchronization pulse output terminal attribute, specifying a destination of the synchronization pulse; or
   a trigger clock minimum period attribute, specifying a minimum period for the trigger clock.

7. The memory medium of claim 4, wherein the set of attributes for each of the plurality of devices further comprises:
   a sample clock delay attribute, specifying a delay for a sample clock of a respective one of the plurality devices relative to others of the plurality of devices.

8. The memory medium of claim 2, wherein the plurality of functions comprises:
   a synchronize function, executable to synchronize trigger clock signals for the plurality of devices; and one or more of:
      a configuration function, executable to configure at least a subset of the plurality of attributes for synchronization of the plurality of devices;
      an initiate function, executable to initiate synchronous operation of the plurality of devices;
      a done function, executable to monitor the operation of the plurality of devices; or
      a wait until done function, executable to indicate when operation of the plurality of devices is done.

9. The memory medium of claim 8, wherein the plurality of functions further comprises one or more of:
   a get error description function, executable to provide an error description based on an error code; or
   a get extended error information function, executable to provide extended error information for an error.

10. The memory medium of claim 8, wherein the configuration function comprises a configuration for homogeneous triggers function, wherein said at least a subset of the plurality of attributes comprises attributes related to synchronization of devices with homogeneous triggers.

11. The memory medium of claim 10, wherein the configuration for homogeneous triggers function is executable to configure one or more of:
   one or more reference clocks;
   one or more start triggers;
   one or more reference triggers;
   one or more script triggers; or
   one or more pause triggers.

12. The memory medium of claim 11, wherein the devices with homogeneous triggers are comprised in a single chassis.

13. The memory medium of claim 2, wherein the plurality of functions comprises one or more access functions for the plurality of attributes.

14. The memory medium of claim 1, wherein each function of the plurality of functions comprises a respective text-based function, wherein the program comprises a text-based program, and wherein during execution of the text-based program the text-based function executes to perform the respective functionality.

15. The memory medium of claim 1, wherein each function of the plurality of functions comprises a respective graphical program node, wherein the program comprises a graphical program, and wherein during execution of the graphical program the graphical program node executes to perform the respective functionality.

16. The memory medium of claim 15, wherein each of the respective graphical program nodes are comprised in a palette, and wherein each of the respective graphical program nodes are selectable from the palette for inclusion in the graphical program.

17. The memory medium of claim 1, wherein, in synchronizing the plurality of devices based on the determined trigger clock signals, the the at least one of the plurality of functions is executable to:
   adjust data latencies for each of the plurality of devices.

18. A system, comprising:
   a processor; and
   a memory, coupled to the processor, wherein the memory stores program instructions executable by the processor to implement an application programming interface (API) for synchronizing a plurality of devices, comprising a plurality of synchronization functions and a plurality of synchronization attributes, wherein the plurality of synchronization functions comprises:
      a synchronize function, executable to synchronize trigger clock signals for the plurality of devices, wherein to synchronize trigger clock signals for the plurality of devices, the synchronize function is executable to:
         query each of the plurality of devices to determine a trigger clock signal for each of the plurality of devices based on one or more of:
            a common sample clock;
            a common reference clock; or
            a specified minimum trigger clock period; and
         synchronize the plurality of devices based on the determined trigger clock signals, wherein, in synchronizing the plurality of devices based on the determined trigger clock signals, the at least one of the plurality of functions is executable to:
            equalize phase of the common sample clock and/or the common reference clock of each of the plurality of devices;
            equalize phase of the trigger clock signals of each of the plurality of devices; and condition driving and/or reception of triggers on trigger enable signals generated from the trigger clock of each of the plurality of devices; and one or more of:
- a configuration function, executable to configure at least a subset of the plurality of attributes for synchronization of the plurality of devices;
- an initiate function, executable to initiate synchronous operation of the plurality of devices;
- a done function, executable to monitor the operation of the plurality of devices; or
- a wait until done function, executable to indicate when operation of the plurality of devices is done;

wherein the plurality of synchronization attributes comprises one or more of:
- one or more trigger attributes for each device; or
- one or more trigger clock attributes for each device.

19. The system of claim 18, wherein the API comprises one or more of:
- a set of text-based program functions, invocable from a text-based program; or
- a set of graphical programming nodes, invocable from a graphical program.

20. A computer-implemented method of synchronizing multiple devices in a system, the method comprising:

including one or more function calls in a program in accordance with an application programming interface (API) for synchronizing multiple devices in the system, wherein the API comprises a plurality of functions invocable in a program to synchronize a plurality of devices, wherein each function is executable to perform a respective functionality related to synchronizing the plurality of devices, and wherein at least one of the plurality of functions is executable to access a plurality of instrument drivers corresponding respectively to the plurality of devices to synchronize the plurality of devices; and executing the program, including executing the one or more function calls to invoke the at least one of the plurality of functions to synchronize the plurality of devices by:
- querying each of the plurality of devices to determining a trigger clock signal for each of the plurality of devices based on one or more of:
  - a common sample clock;
  - a common reference clock; or
  - a specified minimum trigger clock period; and
- synchronizing the plurality of devices based on the determined trigger clock signals, including:
  - equalizing phase of the common sample clock and/or the common reference clock of each of the plurality of devices;
  - equalizing phase of the trigger clock signals of each of the plurality of devices; and
  - conditioning driving and/or reception of triggers on trigger enable signals generated from the trigger clock of each of the plurality of devices.

* * * * *